(12) United States Patent
Hirose

(10) Patent No.: US 11,762,264 B2
(45) Date of Patent: Sep. 19, 2023

(54) PROJECTION SYSTEM AND PROJECTION LENS UNIT

(71) Applicant: KONICA MINOLTA PLANETARIUM CO., LTD., Tokyo (JP)

(72) Inventor: Masatoshi Hirose, Toyokawa (JP)

(73) Assignee: KONICA MINOLTA PLANETARIUM CO., LTD., Tokyo (JP)

(*) Notice: Subject to any disclaimer, the term of this patent is extended or adjusted under 35 U.S.C. 154(b) by 289 days.

(21) Appl. No.: 17/294,186

(22) PCT Filed: Nov. 13, 2019

(86) PCT No.: PCT/JP2019/044454
§ 371 (c)(1),
(2) Date: May 14, 2021

(87) PCT Pub. No.: WO2020/105519
PCT Pub. Date: May 28, 2020

(65) Prior Publication Data
US 2022/0075243 A1 Mar. 10, 2022

(30) Foreign Application Priority Data
Nov. 20, 2018 (JP) .................. 2018-217501

(51) Int. Cl.
*G03B 21/13* (2006.01)
*G02B 5/00* (2006.01)

(52) U.S. Cl.
CPC ............ *G03B 21/13* (2013.01); *G02B 5/005* (2013.01)

(58) Field of Classification Search
CPC ...... G03B 21/008; G03B 21/13; G03B 21/28; G03B 21/145; G03B 21/2053;
(Continued)

(56) References Cited

U.S. PATENT DOCUMENTS

| 5,053,934 A | 10/1991 | Krebs | |
| 9,436,074 B2 * | 9/2016 | Vermeirsch | ............ G03B 21/26 |

(Continued)

FOREIGN PATENT DOCUMENTS

| JP | 2002072361 A | 3/2002 |
| JP | 2008288714 A | 11/2008 |

(Continued)

OTHER PUBLICATIONS

International Search Report for International Application No. PCT/JP2019/044454; dated Jan. 21, 2020.
(Continued)

*Primary Examiner* — Sultan Chowdhury
(74) *Attorney, Agent, or Firm* — CANTOR COLBURN LLP

(57) ABSTRACT

There is provided a projection system including a plurality of projectors that perform edge blending, each of the plurality of projectors including: an image display element; a light blocking plate that reduces an amount of light in an edge overlapping portion of a light bundle; and an aperture diaphragm that changes an amount of light traveling-toward an object to be projected, wherein when a circle formed by an outermost perimeter of a light passing region obtained when the aperture diaphragm is completely opened is defined as a reference circle, the aperture diaphragm partially covers the inside of the reference circle such that an outline of the reference circle is divided into three or more sections in a state where the aperture diaphragm is narrowed to make an area of the light passing region inside the reference circle half the reference circle.

7 Claims, 31 Drawing Sheets

(58) Field of Classification Search
CPC .. G03B 21/2066; H04N 9/315; H04N 9/3102; H04N 9/3141; G02B 5/003; G02B 5/005; G02B 5/0278; G02B 5/0284
See application file for complete search history.

(56) References Cited

U.S. PATENT DOCUMENTS

| | | | |
|---|---|---|---|
| 11,269,117 B2* | 3/2022 | Imaoka | G02B 5/04 |
| 2007/0064203 A1* | 3/2007 | Sawai | H04N 9/3155 |
| | | | 353/97 |

FOREIGN PATENT DOCUMENTS

| | | |
|---|---|---|
| JP | 5939718 B2 | 5/2016 |
| JP | 2017175301 A | 9/2017 |

OTHER PUBLICATIONS

PCT Written Opinion of the International Search Authority for International Application No. PCT/JP2019/044454; dated Jan. 21, 2020.

* cited by examiner

PROJECTION SYSTEM AND PROJECTION LENS UNIT

CROSS REFERENCE TO RELATED APPLICATIONS

This is the U.S. national stage of application No. PCT/JP2019/044454, filed on Nov. 13, 2019. Priority under 35 U.S.C. § 119(a) and 35 U.S.C. § 365(b) is claimed from Japanese Application No. 2018-217501 filed Nov. 20, 2018, the disclosure of which is also incorporated herein by reference.

TECHNOLOGICAL FIELD

The present invention relates to a projection system and a projection lens unit.

BACKGROUND

There has been known a multiprojection-related technique of arranging in parallel images projected by a plurality of projectors to thereby form one large screen. One example of the technique is described in Japanese Laid-Open Patent Publication No. 2017-175301 (PTL 1). PTL 1 describes that adjacent projected images are projected to partially overlap with each other. In this case, there is a problem of formation of a black-level-degraded pattern in a region where the projected images overlap with each other, and this problem is receiving attention. PTL 1 describes a projector improved to suppress the formation of the black-level-degraded pattern.

Japanese Patent No. 5939718 (PTL 2) describes a system in which a diaphragm plate is arranged at a position displaced from a primary image-forming position of a conjugate image in order to form a gradation in a peripheral portion of a projected image.

CITATION LIST

Patent Literature

PTL 1: Japanese Laid-Open Patent Publication No. 2017-175301
PTL 2: Japanese Patent No. 5939718

SUMMARY

When images are projected by a plurality of projectors so as to form one large screen, an overlapping portion of the images becomes too bright. Therefore, in order to avoid this, brightness control is necessary. Thus, it is conceivable to allow the overlapping portion to have uniform brightness by arranging a light blocking plate in front of or inside a lens. However, for example, when images are superimposed on a planetarium that projects the starry sky, even the brightness of a black screen of a projector may in some cases be undesirable. In this case, it is preferable to narrow a diaphragm of a lens.

However, when a simple diaphragm is used in a type of edge blending using a light blocking plate, a desired gradation cannot be formed in an overlapping portion of images.

Accordingly, an object of the present invention is to provide a projection system and a projection lens unit that can form a desired gradation in a type of edge blending using a light blocking plate, regardless of a direction of entry of the light blocking plate.

Solution to Problem

In order to achieve the above-described object, a projection system based on the present invention is a projection system including a plurality of projectors that perform edge blending, each of the plurality of projectors including: an image display element; a light blocking plate that reduces an amount of light in an edge overlapping portion of a light bundle emitted from the image display element; and an aperture diaphragm that changes an amount of light traveling from the image display element toward an object to be projected. When a circle formed by an outermost perimeter of a light passing region obtained when the aperture diaphragm is completely opened is defined as a reference circle, the aperture diaphragm partially covers the inside of the reference circle such that an outline of the reference circle is divided into three or more sections in a state where the aperture diaphragm is narrowed to make an area of the light passing region inside the reference circle half the reference circle.

Advantageous Effects of Invention

According to the present invention, a desired gradation can be formed in a type of edge blending using a light blocking plate, regardless of a direction of entry of the light blocking plate.

DETAILED DESCRIPTION OF EMBODIMENTS

Figure 1:
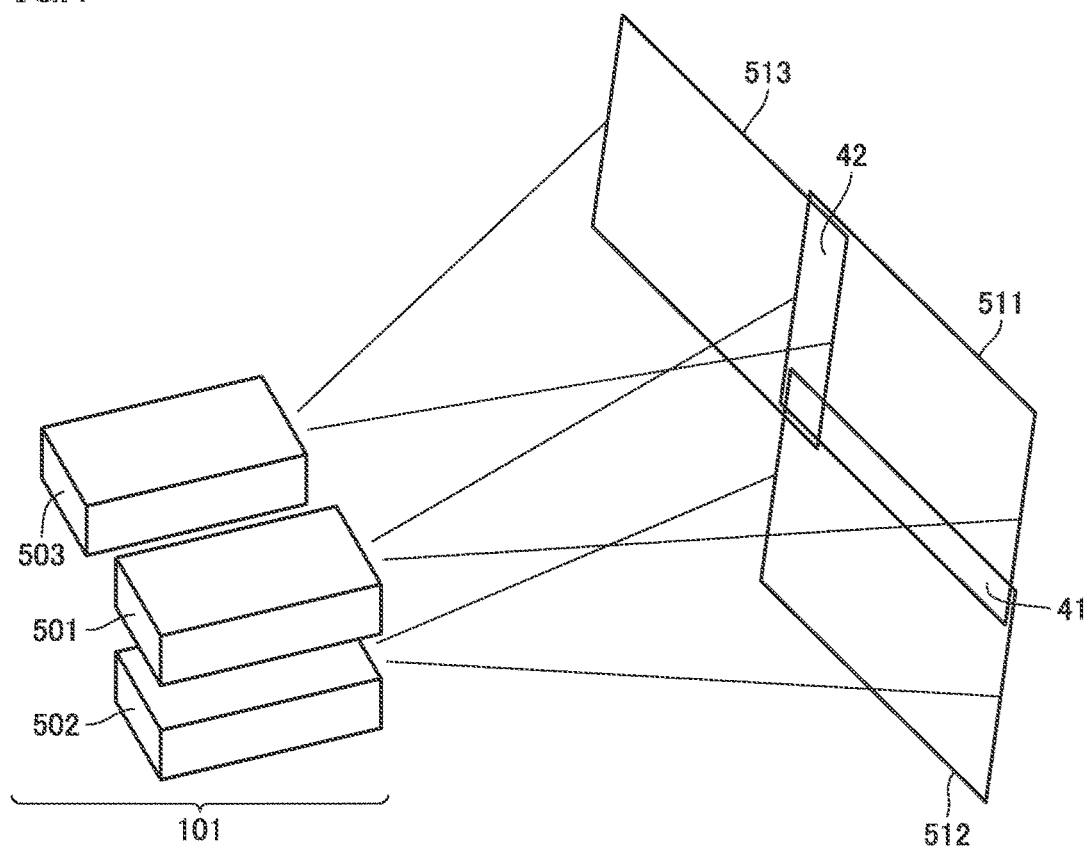
FIG. 1 is a conceptual diagram of a projection system according to a first embodiment based on the present invention.

Before describing some embodiments, a configuration common to the projection systems based on the present invention will be described. FIG. 1 shows an overview of a projection system 101. Projection system 101 includes projectors 501, 502 and 503. For convenience in description, only the three projectors are illustrated herein. Actually, however, the number of the projectors included in one projection system 101 may be two, or four or more.

Images 511, 512 and 513 are projected onto projection target locations from projectors 501, 502 and 503, respectively. Each projection target location may be a preliminarily prepared dedicated screen, a wall of a building, a ceiling or the like. The projection target location is not necessarily a flat surface but may be a curved surface. For example, the projection target location may be a dome-shaped ceiling. There is an overlapping portion 41 between image 511 and image 512. There is an overlapping portion 42 between image 511 and image 513.

Figure 2:
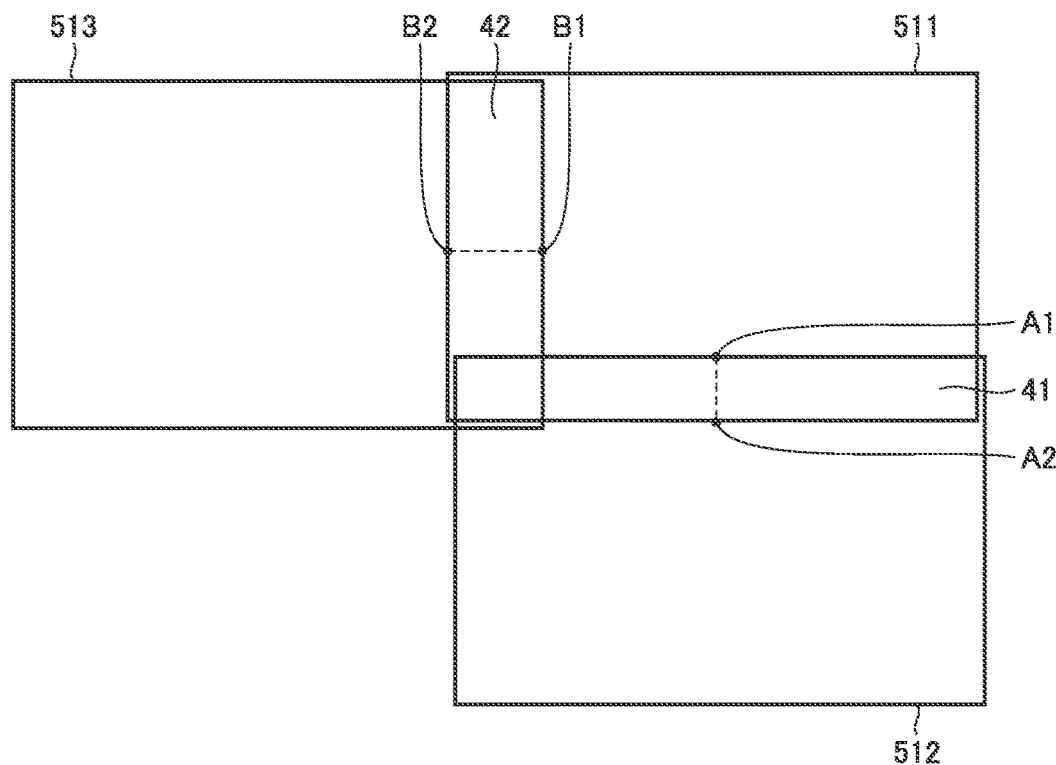
FIG. 2 is a front view of images generated by the projection system according to the first embodiment based on the present invention.

FIG. 2 shows the images on the screen, when seen from the front. Points A1 and A2 are defined in overlapping portion 41. Points B1 and B2 are defined in overlapping portion 42. When attention is focused on a section A1-A2 of overlapping portion 41, the brightness of image 511 is required to gradually decrease from A1 toward A2 with a uniform gradient, and reach 100% at A1 and reach 0% at A2. In contrast, the brightness of image 512 is required to gradually decrease from A2 toward A1 with a uniform gradient, and reach 100% at A2 and reach 0% at A1. When attention is focused on a section B1-B2 of overlapping portion 42, the same applies as well to the brightness of image 511 and the brightness of image 513.

Figure 3:
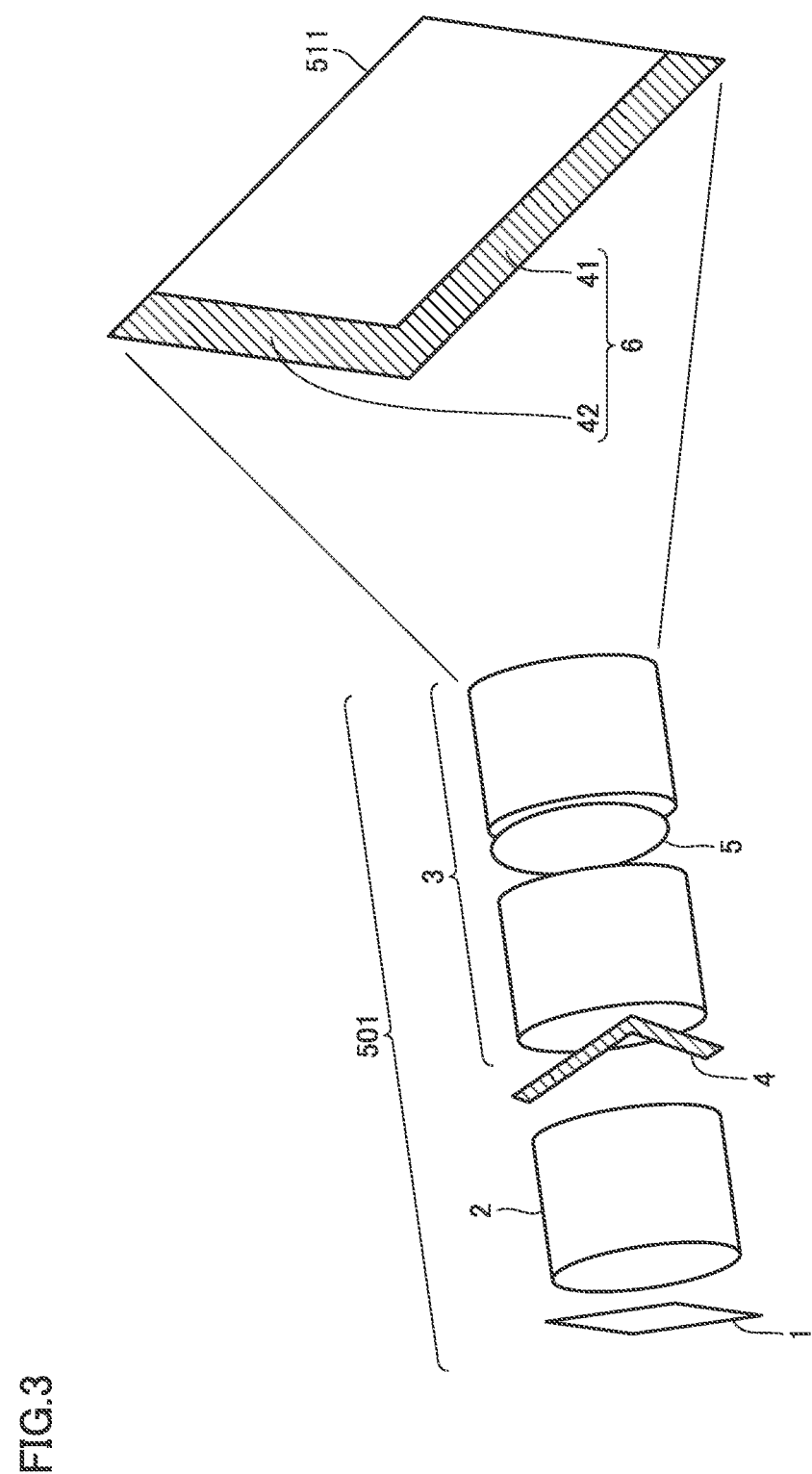
FIG. 3 is a conceptual diagram of a structure of a projector included in the projection system according to the first embodiment based on the present invention.

A structure of projector 501 that projects image 511 is more specifically shown in FIG. 3, for example. An image display element 1, a relay system lens group 2 and a projection system lens group 3 are aligned in this order along a direction of travel of light. Image display element 1 may be a panel-shaped element. Image display element 1 may also serve as a light source. An image is displayed on image display element 1, and then, the light emitted from image display element 1 travels toward the right side in the figure. Image 511 is projected onto the screen by the light emitted from projection system lens group 3. Each of relay system lens group 2 and projection system lens group 3 is formed by combining a plurality of lenses. However, for convenience in description, each of relay system lens group 2 and projection system lens group 3 is herein illustrated to have a cylindrical shape. An L-shaped light blocking plate 4 is arranged between relay system lens group 2 and projection system lens group 3. A shadow region 6 of light blocking plate 4 is formed on two sides of image 511. In the example shown here, region 6 corresponds to overlapping portion 41 and overlapping portion 42. Region 6 is darker than a central portion of image 511. In order to reduce the overall brightness of image 511 to a desired level, an aperture diaphragm 5 is arranged in projection system lens group 3. By reducing an amount of the light by aperture diaphragm 5, the brightness of region 6 can be set at the desired level.

Before describing aperture diaphragm 5 used in the projection system based on the present invention, Reference Examples studied by the inventors will be described.

Reference Example 1

A case in which the aperture diaphragm is a circular diaphragm will be first described as Reference Example 1.

By narrowing the circular diaphragm, a diameter of a light passing region becomes smaller, while maintaining a circular geometry. In a state where the circular diaphragm is narrowed to a certain extent, light shines only on the inside of a region surrounded by a circle 12 concentrically smaller than a reference circle 11, which is an outline of a region on which the light shines when the diaphragm is opened. By adjusting a degree of narrowing, a diameter of circle 12 changes. Herein, description will be continued, assuming that the degree of narrowing is set in a state shown in FIG. 4.

Light emitted from each point of image display element 1 passes through relay system lens group 2, and then, travels as a light bundle to projection system lens group 3. Depending on a position of the light bundle on which attention is focused, a relative positional relationship with light blocking plate 4 changes. Depending on the relative positional relationship with light blocking plate 4, the way in which a shadow 13 of light blocking plate 4 is generated changes as shown in FIG. 4 to FIG. 8. Although the light bundle is narrowed by the circular diaphragm in projection system lens group 3, a circle formed by an imaginary light bundle that can pass when the circular diaphragm is completely opened is defined as reference circle 11. Hereinafter, the imaginary light bundle will be referred to as "reference light bundle", and attention is focused on a positional relationship between the reference light bundle and light blocking plate 4. Actually, the light having a size of the reference light bundle is not emitted from projector 501. The light is narrowed by the circular diaphragm, and thus, the light bundle that can pass becomes thinner than the reference light bundle and only the inside of circle 12 serves as a light passing region. The light passing region further changes, depending on the positional relationship with the light blocking plate. In the following description, attention will be focused on the positional relationship between the reference light bundle and light blocking plate 4.

Figure 4:
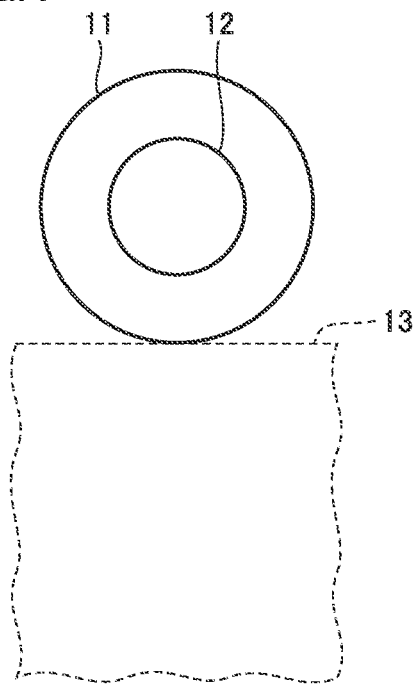
FIG. 4 is an explanatory diagram of a light passing state when a light blocking plate is located at a first position in Reference Example 1.

When light blocking plate 4 does not block the reference light bundle at all, the state shown in FIG. 4 is attained. Since light blocking plate 4 for suppressing the brightness of an image overlapping portion has a linear geometry, light blocking plate 4 generates a shadow having a linear side. In FIG. 4, shadow 13 of light blocking plate 4 is located below reference circle 11 and outside reference circle 11.

Figure 5:
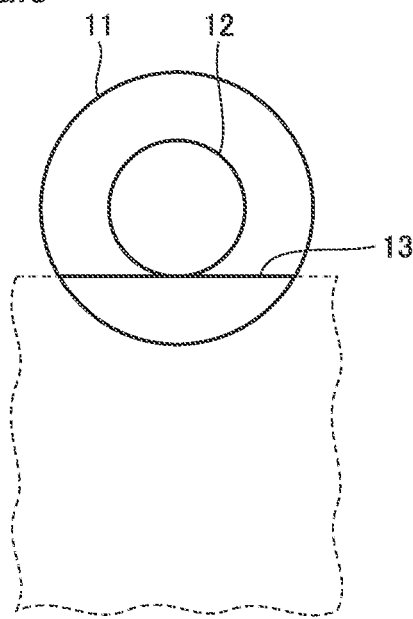
FIG. 5 is an explanatory diagram of a light passing state when the light blocking plate is located at a second position in Reference Example 1.

Next, when light blocking plate 4 goes into the reference light bundle to a certain extent, a state shown in FIG. 5 is attained. In the state shown in FIG. 5, although shadow 13 of light blocking plate 4 goes into reference circle 11, shadow 13 of light blocking plate 4 does not go into circle 12. In FIG. 4 to FIG. 5, an amount of light that actually passes, i.e., an amount of light inside circle 12 does not change.

Figure 6:
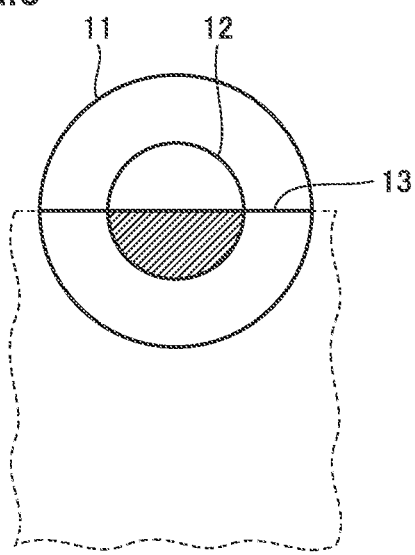
FIG. 6 is an explanatory diagram of a light passing state when the light blocking plate is located at a third position in Reference Example 1.

When light blocking plate 4 goes into the reference light bundle more deeply, a state shown in FIG. 6 is attained. In this figure, shadow 13 of light blocking plate 4 covers a half of circle 12. Therefore, the amount of light inside circle 12 is halved. That is, the amount of light that actually passes is halved.

Figure 7:
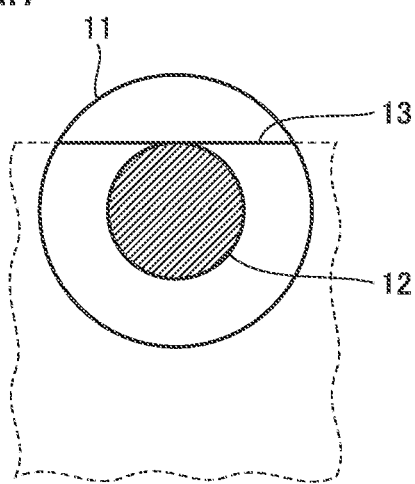
FIG. 7 is an explanatory diagram of a light passing state when the light blocking plate is located at a fourth position in Reference Example 1.

When light blocking plate 4 goes into the reference light bundle more deeply, a state shown in FIG. 7 is attained. In this state, the inside of circle 12 is completely covered with shadow 13 of light blocking plate 4. Therefore, the inside of circle 12 is completely dark. That is, the amount of light that actually passes is zero.

Figure 8:
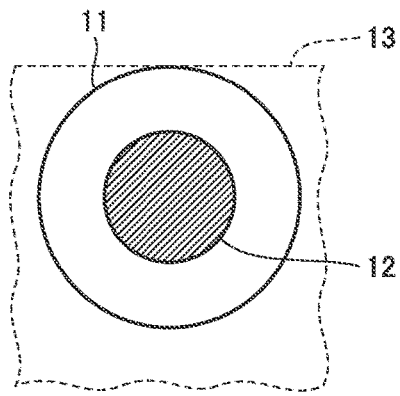
FIG. 8 is an explanatory diagram of a light passing state when the light blocking plate is located at a fifth position in Reference Example 1.

When light blocking plate 4 goes into the reference light bundle more deeply, a state shown in FIG. 8 is attained. In this state as well, the amount of light that actually passes is zero. In FIG. 7 to FIG. 8, the amount of light inside circle 12 does not change.

Figure 9:
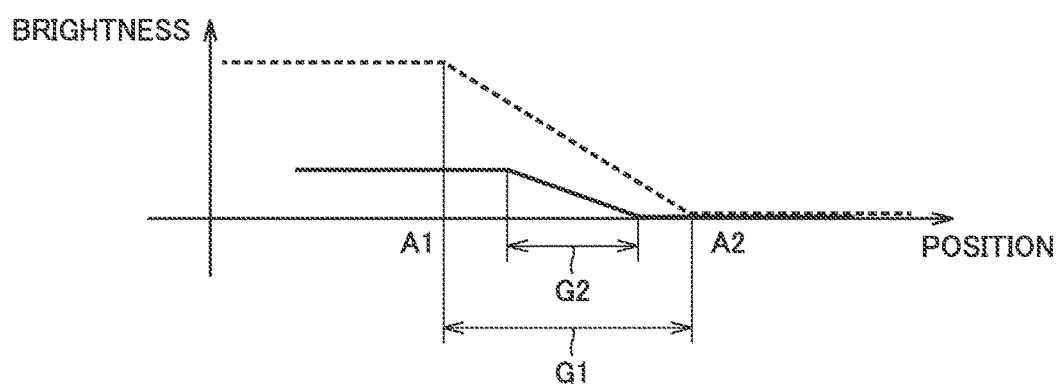
FIG. 9 is a graph showing the brightness at each position on a straight line A1-A2 in Reference Example 1.

The extent to which shadow 13 of light blocking plate 4 goes into reference circle 11 and circle 12 can also be considered in association with a position of a point in image 511 on which attention is focused. The brightness at each position on a straight line connecting points A1 and A2 in FIG. 2 is shown in graph form in FIG. 9. The brightness to be obtained relative to the brightness when the diaphragm is completely opened is shown by a broken line. That is, assuming that the original brightness is 100%, the brightness is 100% before A1. However, in a section A1-A2, the brightness decreases with a certain gradient with increasing distance from A1, and reaches 0% at A2 and further remains at 0% after A2. Actually, the brightness reduced in level as a whole is obtained, and thus, a smaller value of the brightness at and before A1 is required, and it is required that in the section A1-A2, the brightness decreases with a certain gradient with increasing distance from A1, and reaches 0% at A2. That is, it is important that the brightness decreases with a certain gradient in a range G1. When such a condition is satisfied, the brightness between A1 and A2 has an appropriate gradation. However, in the case of the circular diaphragm, the situations described with reference to FIG. 4 to FIG. 8 occur, and thus, the brightness shown by a solid line in FIG. 9 is actually obtained. This is not identical to the desired gradation. The gradation is obtained only in a range G2 smaller than range G1 of the desired gradation. Range G2 is greatly different from range G1 of the target gradation.

Reference Example 2

Figure 10:
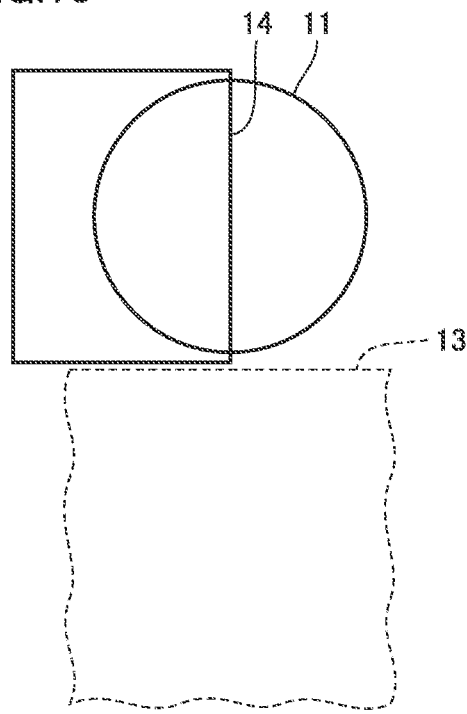
FIG. 10 is an explanatory diagram of a light passing state when a light blocking plate is located at a first position in Reference Example 2.

Next, a case in which the aperture diaphragm is a plate-shaped diaphragm will be described as Reference Example 2. The plate-shaped diaphragm herein refers to a type of a diaphragm that adjusts an amount of light by moving forward and backward a plate having a linear side in one direction. Reference Example 2 shows an example in which shadow 13 of light blocking plate 4 goes into reference circle 11 from below. This corresponds to overlapping portion 41 in FIG. 2. When the plate-shaped diaphragm is narrowed by approximately half, a state shown in FIG. 10 is attained. A half of reference circle 11 is covered with a diaphragm plate 14. Herein, description will be continued, assuming that a degree of narrowing is set in the state shown in FIG. 10.

When light blocking plate 4 does not block the reference light bundle at all, the state shown in FIG. 10 is attained. In FIG. 10, shadow 13 of light blocking plate 4 is located outside reference circle 11.

Figure 11:
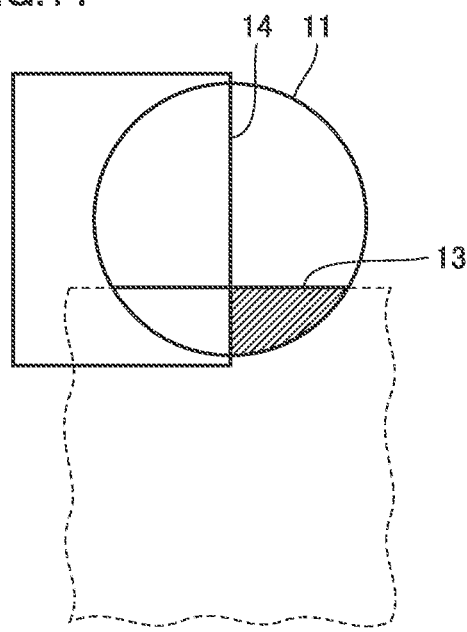
FIG. 11 is an explanatory diagram of a light passing state when the light blocking plate is located at a second position in Reference Example 2.

When light blocking plate 4 goes into the reference light bundle to a certain extent, a state shown in FIG. 11 is attained. In the state shown in FIG. 11, shadow 13 of light blocking plate 4 goes into reference circle 11 to a certain extent. As a result, an amount of light that actually passes is reduced to a certain extent.

Figure 12:
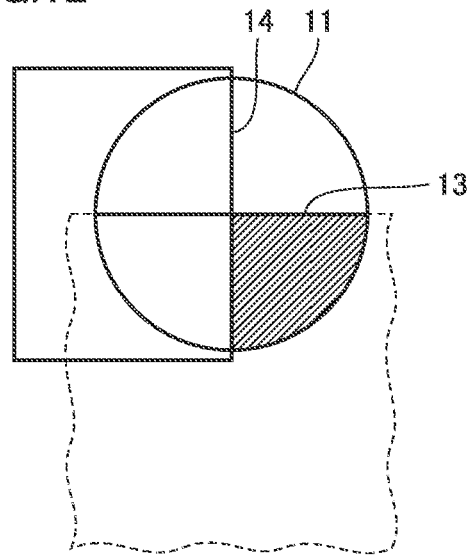
FIG. 12 is an explanatory diagram of a light passing state when the light blocking plate is located at a third position in Reference Example 2.

When light blocking plate 4 goes into the reference light bundle by half, a state shown in FIG. 12 is attained. In the state shown in FIG. 12, shadow 13 of light blocking plate 4 goes into reference circle 11 by half. As a result, the amount of light that actually passes is reduced in half.

Figure 13:
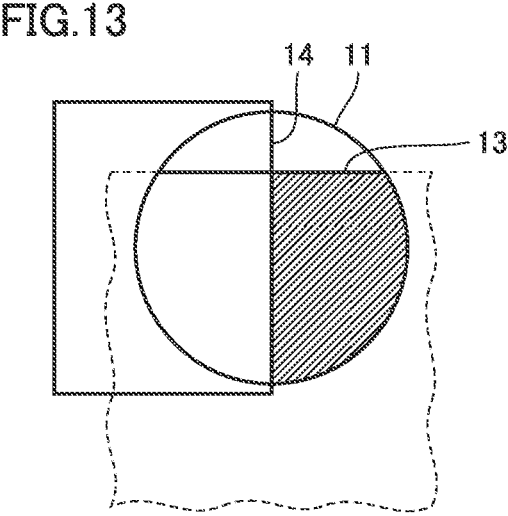
FIG. 13 is an explanatory diagram of a light passing state when the light blocking plate is located at a fourth position in Reference Example 2.

When light blocking plate 4 goes into the reference light bundle more deeply, a state shown in FIG. 13 is attained. In the state shown in FIG. 13, shadow 13 of light blocking plate 4 covers most of the inside of reference circle 11. As a result, the amount of light that actually passes is limited to a very small amount.

Figure 14:
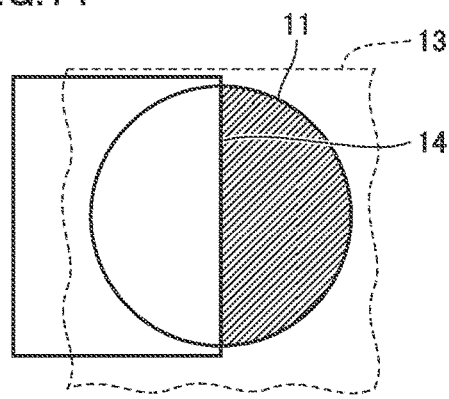
FIG. 14 is an explanatory diagram of a light passing state when the light blocking plate is located at a fifth position in Reference Example 2.

When light blocking plate 4 goes into the reference light bundle more deeply, a state shown in FIG. 14 is attained. In this state, the inside of reference circle 11 is completely covered with shadow 13 of light blocking plate 4. Therefore, the amount of light that actually passes is zero.

Figure 15:
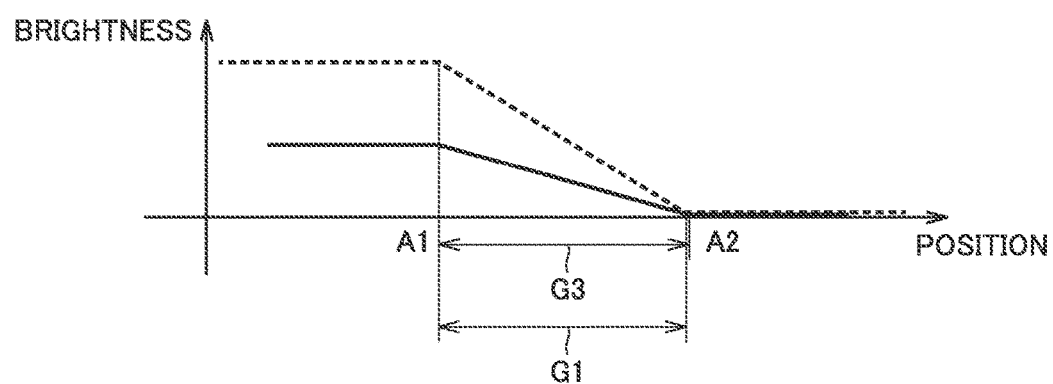
FIG. 15 is a graph showing the brightness at each position on the straight line A1-A2 in Reference Example 2.

In the case of Reference Example 2, the situations described with reference to FIG. 10 to FIG. 14 occur, and thus, the brightness at each position on a straight line connecting points A1 and A2 is shown in graph form in FIG. 15. In this case, the brightness decreases with a certain gradient in the section A1-A2, and thus, the brightness between A1 and A2 has an appropriate gradation. A range in which the gradation is obtained between A1 and A2 is a range G3, and this is almost identical to range G1 of the target gradation.

Reference Example 3

Figure 16:
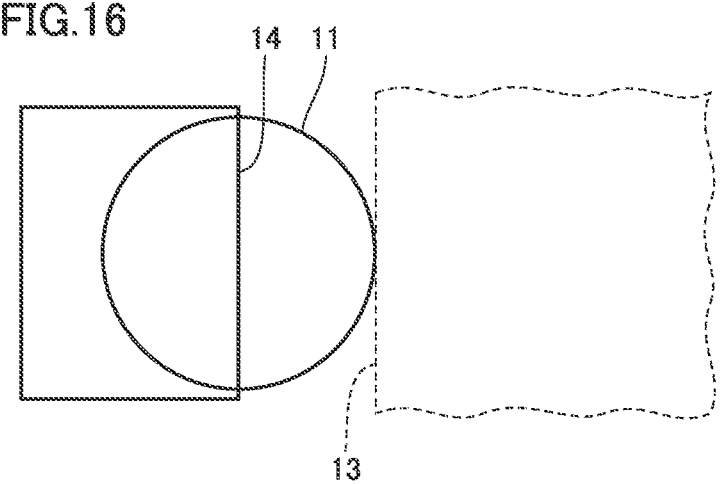
FIG. 16 is an explanatory diagram of a light passing state when a light blocking plate is located at a first position in Reference Example 3.

Reference Example 3 shows an example in which shadow 13 of light blocking plate 4 goes into reference circle 11 from right. This corresponds to overlapping portion 42 in FIG. 2. A degree of narrowing of the plate-shaped diaphragm in Reference Example 3 is similar to that in Reference Example 2. When shadow 13 of light blocking plate 4 does not go into reference circle 11 at all, a state shown in FIG. 16 is attained. Shadow 13 of light blocking plate 4 is located outside reference circle 11. Shadow 13 is located opposite to a side where diaphragm plate 14 goes into reference circle 11, relative to reference circle 11.

Figure 17:
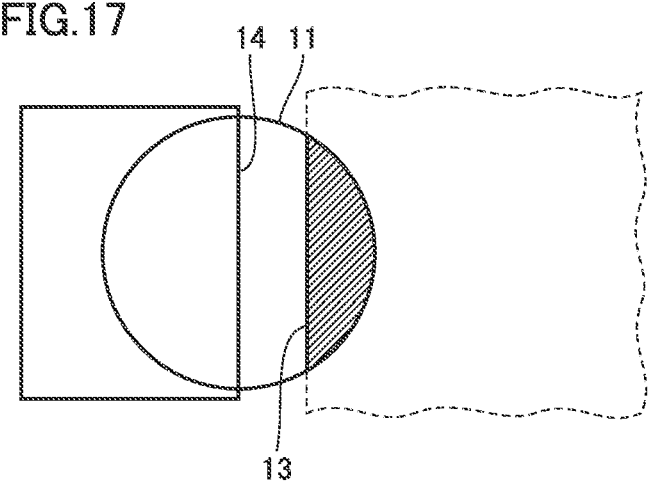
FIG. 17 is an explanatory diagram of a light passing state when the light blocking plate is located at a second position in Reference Example 3.

When light blocking plate 4 goes into the reference light bundle to a certain extent, a state shown in FIG. 17 is attained. In the state shown in FIG. 17, shadow 13 of light blocking plate 4 goes into reference circle 11 to a certain extent. As a result, an amount of light that actually passes is reduced to a certain extent.

Figure 18:
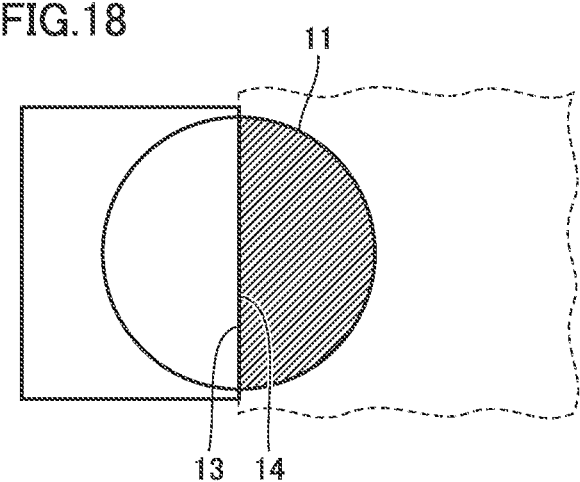
FIG. 18 is an explanatory diagram of a light passing state when the light blocking plate is located at a third position in Reference Example 3.

When light blocking plate 4 goes into the reference light bundle by half, a state shown in FIG. 18 is attained. In the state shown in FIG. 18, shadow 13 of light blocking plate 4 completely covers the light passing portion inside reference circle 11. As a result, the amount of light that actually passes is zero.

Figure 19:
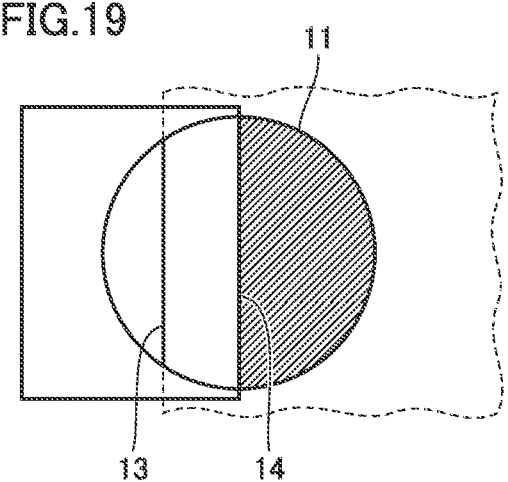
FIG. 19 is an explanatory diagram of a light passing state when the light blocking plate is located at a fourth position in Reference Example 3.

When light blocking plate 4 goes into the reference light bundle more deeply, a state shown in FIG. 19 is attained. In this state as well, the light passing portion inside reference circle 11 is still completely covered with shadow 13 of light blocking plate 4.

Figure 20:
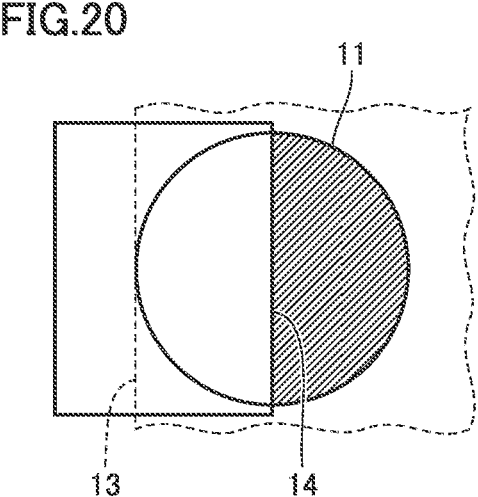
FIG. 20 is an explanatory diagram of a light passing state when the light blocking plate is located at a fifth position in Reference Example 3.

When light blocking plate 4 goes into the reference light bundle more deeply, a state shown in FIG. 20 is attained. In this state as well, the light passing portion inside reference circle 11 is still completely covered with shadow 13 of light blocking plate 4. Although a relative position of light blocking plate 4 with respect to the reference light bundle varies in FIG. 18 to FIG. 20, the amount of light that can pass through the inside of reference circle 11 is zero and remains unchanged in FIG. 18 to FIG. 20.

Figure 21:
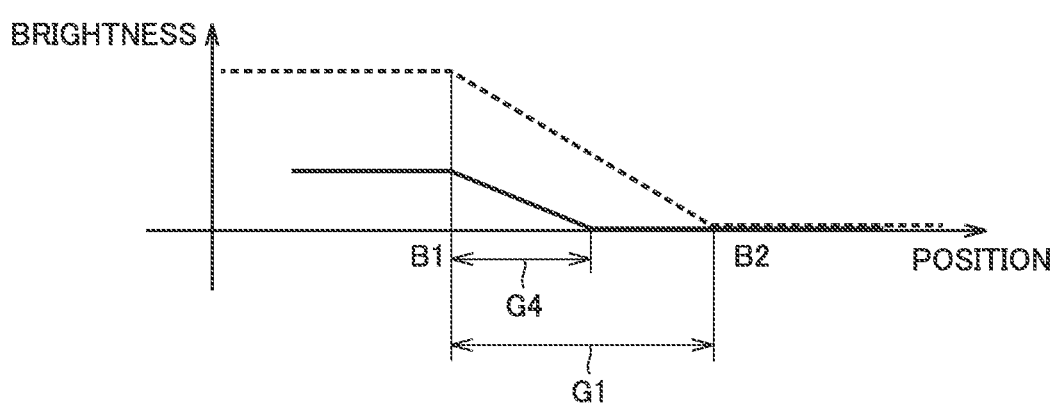
FIG. 21 is a graph showing the brightness at each position on a straight line B1-B2 in Reference Example 3.

In the case of Reference Example 3, the situations described with reference to FIG. 16 to FIG. 20 occur, and thus, the brightness at each position on a straight line connecting points B1 and B2 is shown in graph form in FIG. 21. In this case, the brightness does not decrease with a certain gradient in the section B1-B2, but decreases in an early stage with increasing distance from B1, and reaches zero far before B2. That is, the brightness between B1 and B2 does not have an appropriate gradation. A range in which the gradation is obtained between B1 and B2 is only a range G4, and this is greatly different from range G1 of the target gradation.

Although the plate-shaped diaphragm is used in both of Reference Examples 2 and 3, there is a difference in appropriateness of the gradation, depending on from which side shadow 13 of light blocking plate 4 comes. The brightness between A1 and A2 has an appropriate gradation as shown in Reference Example 2, whereas the brightness between B1 and B2 does not have an appropriate gradation as shown in Reference Example 3. In such a state having variations, a difference in image quality of the overlapping portion arises, depending on a direction of extension of the overlapping portion, and thus, a good image cannot be generated as a whole.

Accordingly, the present invention has been made to solve the problems in Reference Examples 1 to 3. A projection system based on the present invention will be described below.

First Embodiment

Figure 22:
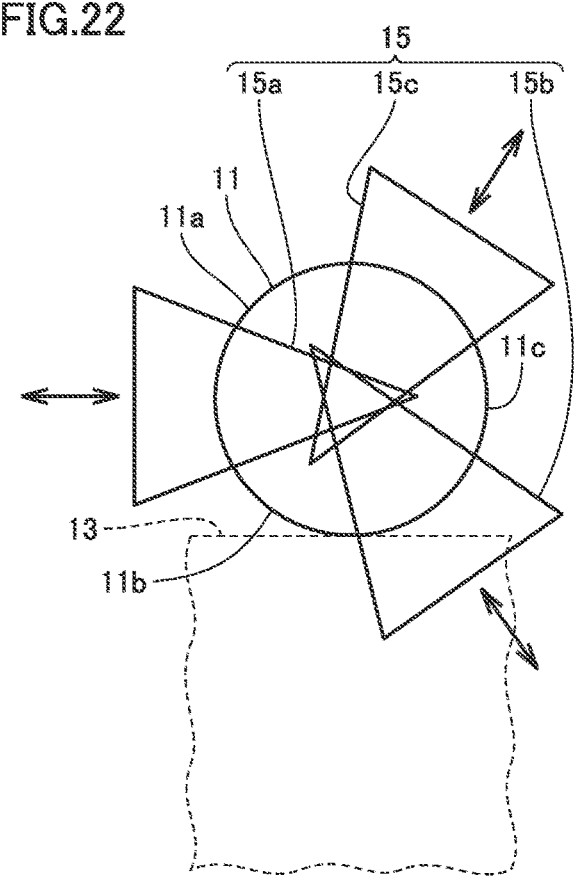
FIG. 22 is an explanatory diagram of a light passing state when a shadow of a light blocking plate coming from the lower side is located at a first position in the projection system according to the first embodiment based on the present invention.

A projection system according to a first embodiment based on the present invention will be described with reference to FIG. 22 to FIG. 33. Since an overall configuration is similar to that described with reference to FIG. 1, description will not be repeated. The projection system includes an aperture diaphragm 15 as aperture diaphragm 5 in FIG. 3. Aperture diaphragm 15 includes diaphragm plates 15a, 15b and 15c. Each of diaphragm plates 15a, 15b and 15c has a substantially isosceles triangular shape. Diaphragm plates 15a, 15b and 15c are arranged with equal angular intervals, i.e., with intervals of 120°. As shown by arrows in FIG. 22, diaphragm plates 15a, 15b and 15c can move forward and backward in a radial direction of reference circle 11 from three directions, respectively. FIG. 22 shows a state in which aperture diaphragm 15 is narrowed to a certain extent. Herein, description will be continued, assuming that a degree of narrowing is set in the state shown in FIG. 22.

Firstly, an example in which shadow 13 goes into reference circle 11 from bottom to top will be described. First, when light blocking plate 4 does not block the reference light bundle at all, the state shown in FIG. 22 is attained.

Since light blocking plate 4 for suppressing the brightness of an image overlapping portion has a linear geometry, light blocking plate 4 generates a shadow having a linear side. In this figure, shadow 13 of light blocking plate 4 is located below reference circle 11 and outside reference circle 11.

Figure 23:
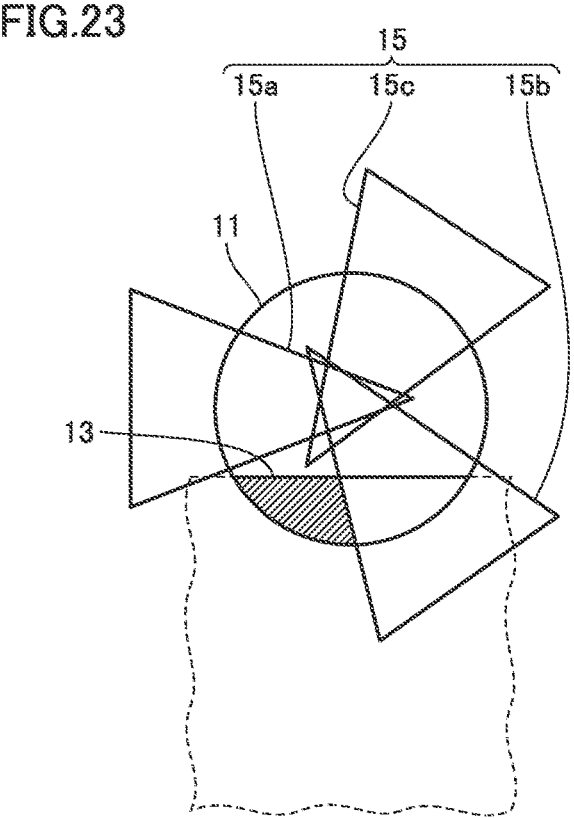
FIG. 23 is an explanatory diagram of a light passing state when the shadow of the light blocking plate coming from the lower side is located at a second position in the projection system according to the first embodiment based on the present invention.

Next, when light blocking plate 4 goes into the reference light bundle to a certain extent, a state shown in FIG. 23 is attained. In the state shown in this figure, shadow 13 of light blocking plate 4 goes into reference circle 11. Most of a light passing region between diaphragm plate 15a and diaphragm plate 15b is covered with shadow 13.

Figure 24:
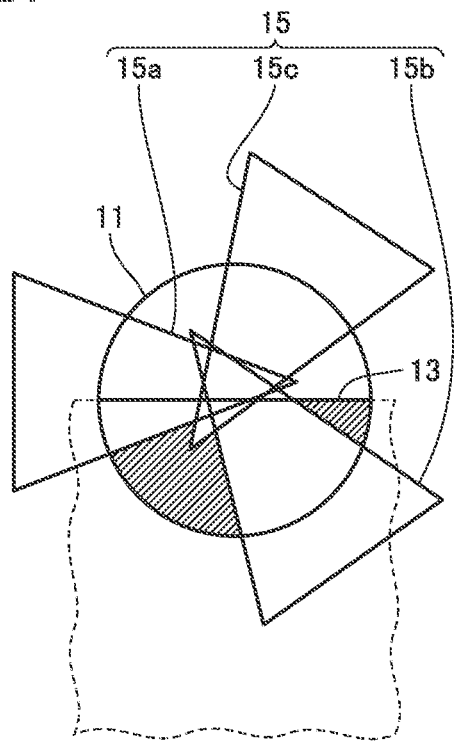
FIG. 24 is an explanatory diagram of a light passing state when the shadow of the light blocking plate coming from the lower side is located at a third position in the projection system according to the first embodiment based on the present invention.

When light blocking plate 4 goes into the reference light bundle more deeply, a state shown in FIG. 24 is attained. In this figure, shadow 13 of light blocking plate 4 goes into a half of reference circle 11. The light passing region between diaphragm plate 15a and diaphragm plate 15b is completely covered with shadow 13. Nearly a half of a light passing region between diaphragm plate 15b and diaphragm plate 15c is covered with shadow 13.

Figure 25:
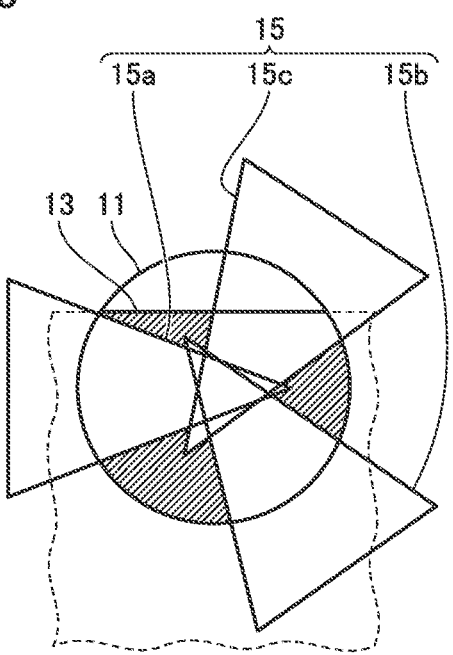
FIG. 25 is an explanatory diagram of a light passing state when the shadow of the light blocking plate coming from the lower side is located at a fourth position in the projection system according to the first embodiment based on the present invention.

When light blocking plate 4 goes into the reference light bundle more deeply, a state shown in FIG. 25 is attained. In this figure, shadow 13 of light blocking plate 4 goes into reference circle 11 to cover most of reference circle 11. The light passing region between diaphragm plate 15a and diaphragm plate 15b is completely covered with shadow 13. The light passing region between diaphragm plate 15b and diaphragm plate 15c is also completely covered with shadow 13. A light passing region between diaphragm plate 15c and diaphragm plate 15a is partially covered with shadow 13.

Figure 26:
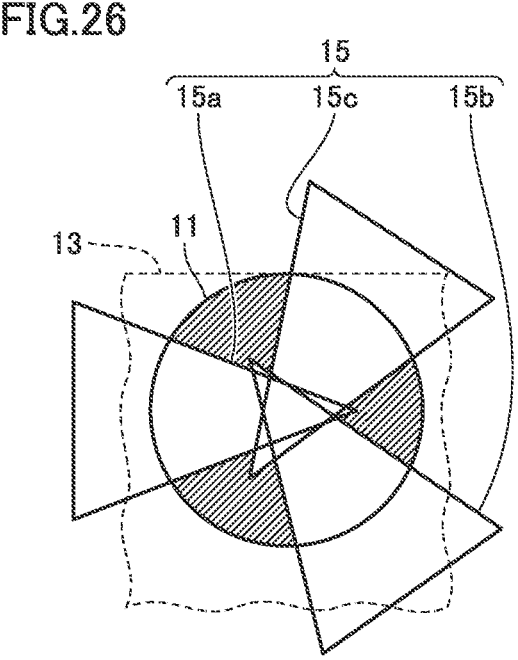
FIG. 26 is an explanatory diagram of a light passing state when the shadow of the light blocking plate coming from the lower side is located at a fifth position in the projection system according to the first embodiment based on the present invention.

When light blocking plate 4 goes into the reference light bundle more deeply, a state shown in FIG. 26 is attained. In this figure, shadow 13 of light blocking plate 4 goes into reference circle 11 to cover the whole of reference circle 11. The light passing regions in the gaps among diaphragm plates 15a, 15b and 15c are all completely covered with shadow 13.

Figure 27:
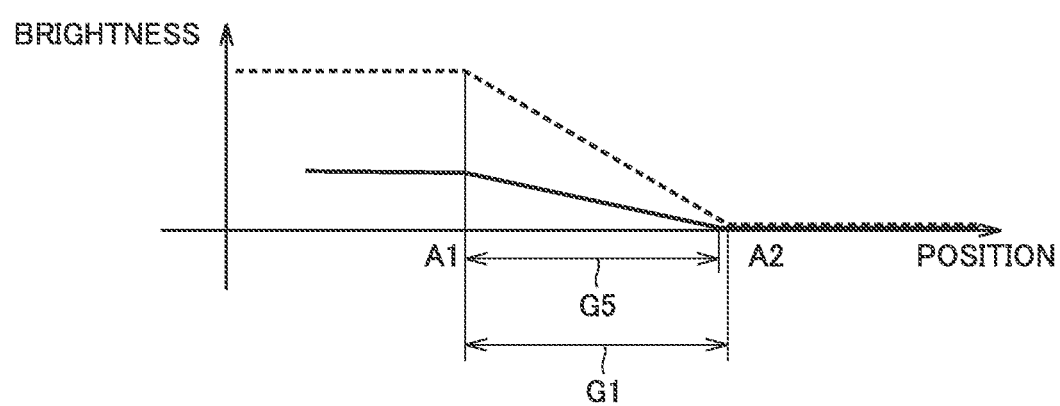
FIG. 27 is a graph showing the brightness at each position on the straight line A1-A2 in the first embodiment based on the present invention.

The brightness at each position on a straight line connecting points A1 and A2 in FIG. 2 is shown in graph form in FIG. 27. The brightness decreases with a certain gradient in the section A1-A2, and thus, the brightness between A1 and A2 has an appropriate gradation. A range in which the gradation is obtained between A1 and A2 is a range G5, and this is almost identical to range G1 of the target gradation.

Figure 28:
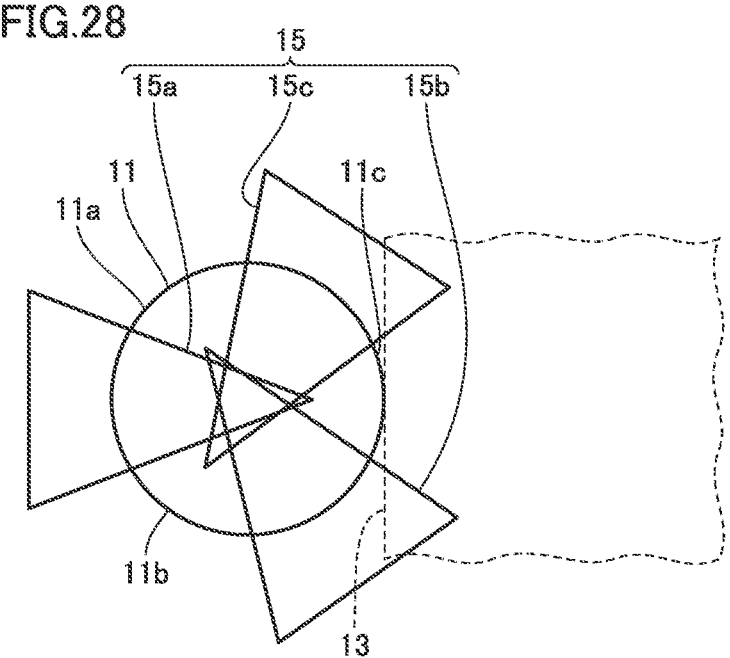
FIG. 28 is an explanatory diagram of a light passing state when the shadow of the light blocking plate coming from the right side is located at a first position in the projection system according to the first embodiment based on the present invention.

Secondly, a case in which shadow 13 goes into reference circle 11 from right to left will be described. First, when light blocking plate 4 does not block the reference light bundle at all, a state shown in FIG. 28 is attained. In this figure, shadow 13 of light blocking plate 4 is located on the right side of reference circle 11 and outside reference circle 11.

Figure 29:
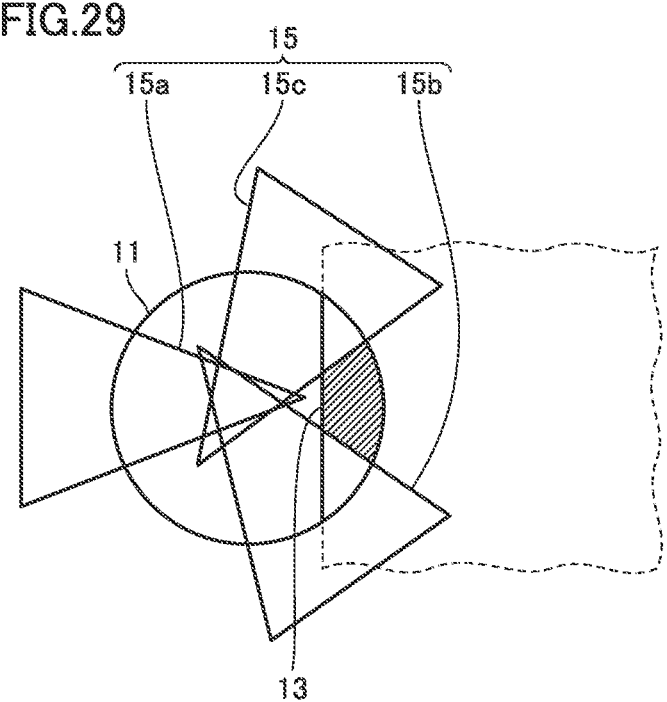
FIG. 29 is an explanatory diagram of a light passing state when the shadow of the light blocking plate coming from the right side is located at a second position in the projection system according to the first embodiment based on the present invention.
Figure 30:
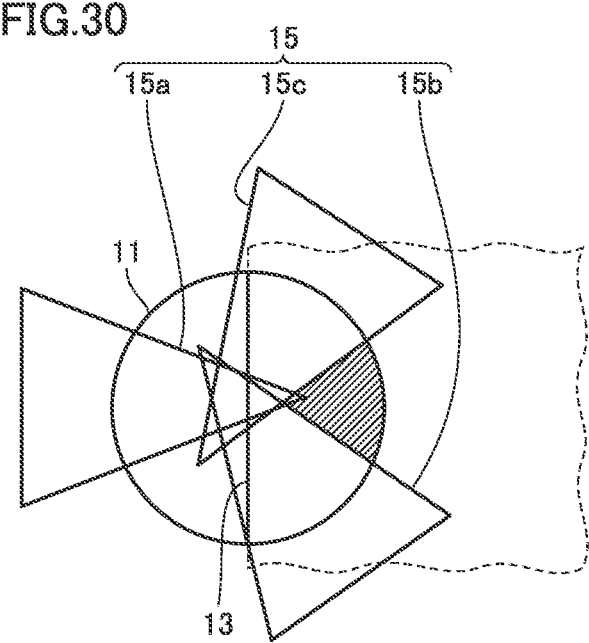
FIG. 30 is an explanatory diagram of a light passing state when the shadow of the light blocking plate coming from the right side is located at a third position in the projection system according to the first embodiment based on the present invention.
Figure 31:
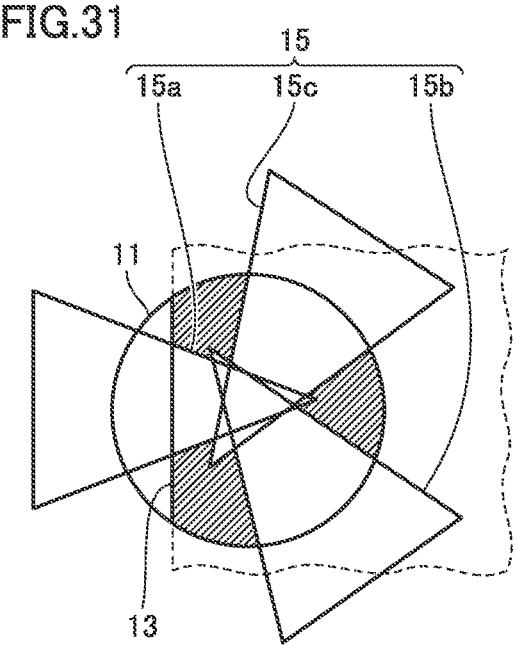
FIG. 31 is an explanatory diagram of a light passing state when the shadow of the light blocking plate coming from the right side is located at a fourth position in the projection system according to the first embodiment based on the present invention.
Figure 32:
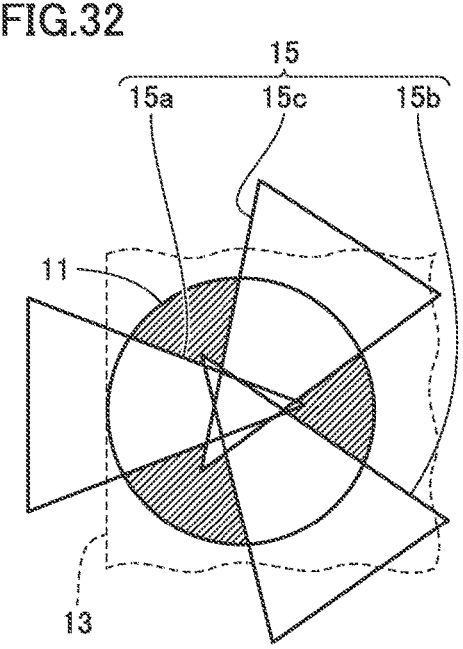
FIG. 32 is an explanatory diagram of a light passing state when the shadow of the light blocking plate coming from the right side is located at a fifth position in the projection system according to the first embodiment based on the present invention.

When light blocking plate 4 goes into the reference light bundle to a certain extent, a state shown in FIG. 29 is attained. When light blocking plate 4 goes into the reference light bundle more deeply, a state shown in FIG. 30 is attained. When light blocking plate 4 goes into the reference light bundle more deeply, a state shown in FIG. 31 is attained. When light blocking plate 4 goes into the reference light bundle more deeply, a state shown in FIG. 32 is attained. In this figure, shadow 13 of light blocking plate 4 goes into reference circle 11 to cover the whole of reference circle 11. The brightness at each position on a straight line connecting points B1 and B2 in FIG. 2 is shown in graph form in FIG. 33. The brightness decreases with a certain gradient in the section B1-B2, and thus, the brightness between B1 and B2 has an appropriate gradation. A range in which the gradation is obtained between B1 and B2 is a range G6, and this is almost identical to range G1 of the target gradation.

Figure 33:
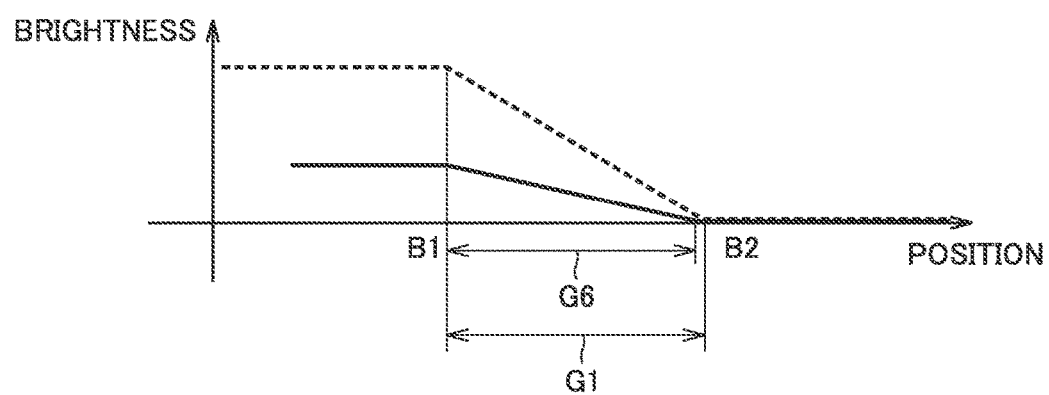
FIG. 33 is a graph showing the brightness at each position on the straight line A1-A2 in the first embodiment based on the present invention.

The graphs in FIG. 27 and FIG. 33 show an overview of the change in brightness. Actually, the brightness does not necessarily change precisely linearly as shown in FIG. 27 and FIG. 33. For example, in FIG. 33, the brightness does not constantly decrease precisely with a certain gradient in the section B1-B2, but the brightness may remain almost unchanged at some midpoint in the section B1-B2. In this way, in a part of the section, the brightness may remain unchanged, or the brightness may change with a different gradient. For convenience in description, these graphs schematically show the change in brightness, with minor inconsistency being omitted.

The configuration of the projection system according to the present embodiment can be described as follows. The projection system is a projection system including a plurality of projectors that perform edge blending, each of the plurality of projectors including: image display element 1; light blocking plate 4 that reduces an amount of light in an edge overlapping portion of a light bundle emitted from image display element 1; and aperture diaphragm 5 that changes an amount of light traveling from image display element 1 toward an object to be projected. When a circle formed by an outermost perimeter of a light passing region obtained when aperture diaphragm 5 is completely opened is defined as reference circle 11, aperture diaphragm 5 partially covers the inside of reference circle 11 such that an outline of reference circle 11 is divided into three or more sections in a state where aperture diaphragm 5 is narrowed to make an area of the light passing region inside reference circle 11 half reference circle 11.

In the present embodiment, the gradation can be formed in the range that is almost identical to the range of the target gradation, regardless of from which side shadow 13 of light blocking plate 4 comes. In other words, in the present embodiment, a desired gradation can be formed in a type of edge blending using a light blocking plate, regardless of a direction of entry of the light blocking plate.

As described in the present embodiment, aperture diaphragm 15 preferably includes three or more diaphragm plates 15a, 15b and 15c held to be movable forward and backward in the radial direction of reference circle 11 from three or more directions. With this configuration, even the diaphragm plates each having a simple shape can equally cover the inside of the reference circle.

Each of three or more diaphragm plates 15a, 15b and 15c preferably has such a tapered shape that a width becomes narrower toward a tip. With this configuration, it becomes easy to gradually reduce an area of the light transmission regions.

Second Embodiment

A projection system according to a second embodiment based on the present invention will be described with reference to FIG. 34 to FIG. 43. Since an overall configuration is similar to that described with reference to FIG. 1, description will not be repeated. The projection system includes an aperture diaphragm 16 as aperture diaphragm 5 in FIG. 3. Aperture diaphragm 16 includes diaphragm plates 16a and 16b. Diaphragm plate 16a has a shape formed by combining three substantially isosceles triangular shapes. Diaphragm plate 16b has a shape formed by combining two substantially isosceles triangular shapes. It can also be said that each of diaphragm plates 16a and 16b has a comb shape. Diaphragm plates 16a and 16b are arranged to face each other, and each of diaphragm plates 16a and 16b can move forward and backward in a radial direction of reference circle 11 from two directions as shown by arrows in FIG. 34. In a state where aperture diaphragm 16 is completely closed, the protruding and recessed shapes of diaphragm plates 16a and 16b engage with each other completely, such that an opening is zero.

In the present embodiment, aperture diaphragm 16 includes two diaphragm plates 16a and 16b held to be movable forward and backward in the radial direction of reference circle 11 from the two directions opposite to each other, to block light. In the present embodiment, each of two diaphragm plates 16a and 16b has a comb shape.

Figure 34:
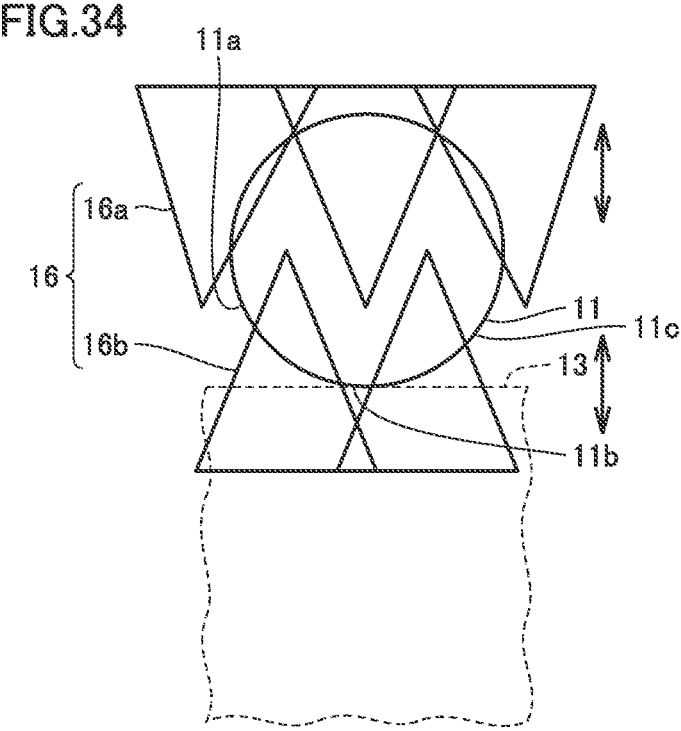
FIG. 34 is an explanatory diagram of a light passing state when a shadow of a light blocking plate coming from the lower side is located at a first position in a projection system according to a second embodiment based on the present invention.

FIG. 34 shows a state in which aperture diaphragm 16 is narrowed to a certain extent. Herein, description will be continued, assuming that a degree of narrowing is set in the state shown in FIG. 34.

Firstly, a case in which shadow 13 goes into reference circle 11 from bottom to top will be described. First, when light blocking plate 4 does not block the reference light bundle at all, the state shown in FIG. 34 is attained. In this figure, shadow 13 of light blocking plate 4 is located below reference circle 11 and outside reference circle 11.

Figure 35:
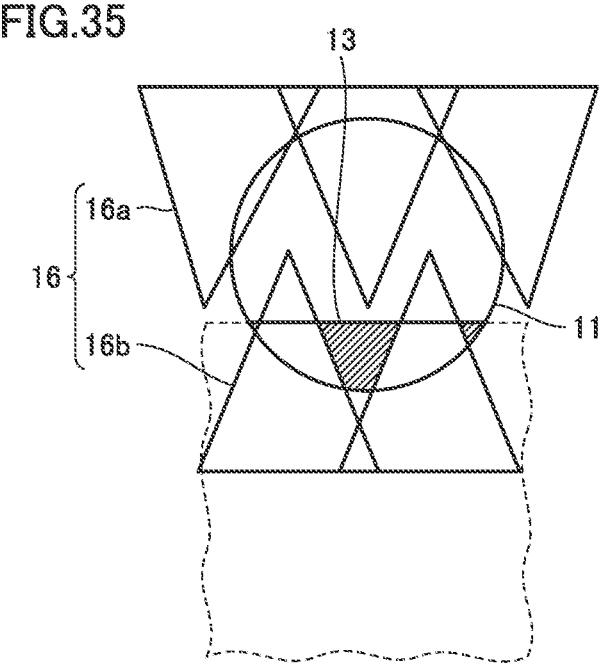
FIG. 35 is an explanatory diagram of a light passing state when the shadow of the light blocking plate coming from the lower side is located at a second position in the projection system according to the second embodiment based on the present invention.

Next, when light blocking plate 4 goes into the reference light bundle to a certain extent, a state shown in FIG. 35 is attained. In the state shown in this figure, shadow 13 of light blocking plate 4 goes into reference circle 11.

Figure 36:
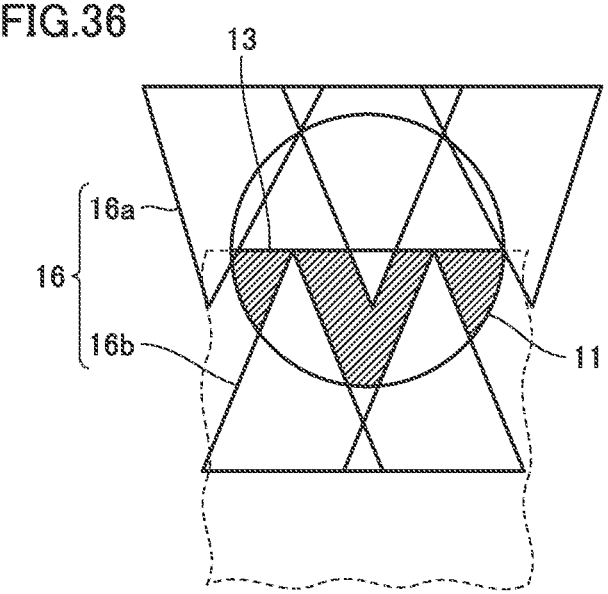
FIG. 36 is an explanatory diagram of a light passing state when the shadow of the light blocking plate coming from the lower side is located at a third position in the projection system according to the second embodiment based on the present invention.

When light blocking plate 4 goes into the reference light bundle more deeply, a state shown in FIG. 36 is attained. In this figure, shadow 13 of light blocking plate 4 goes into a half of reference circle 11. Regions where the light can pass inside reference circle 11 exist as two substantially triangular regions.

Figure 37:
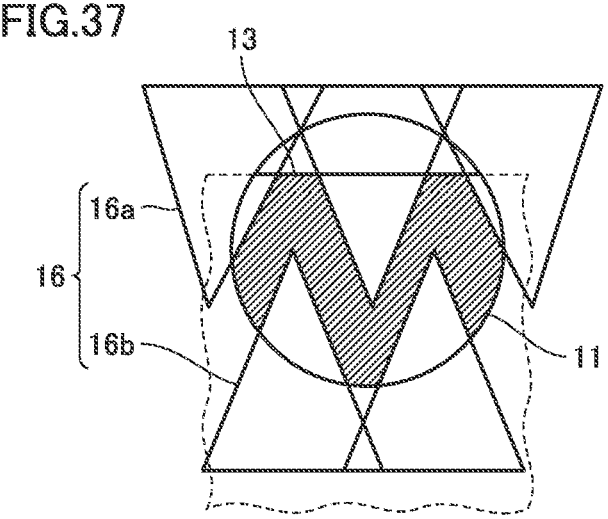
FIG. 37 is an explanatory diagram of a light passing state when the shadow of the light blocking plate coming from the lower side is located at a fourth position in the projection system according to the second embodiment based on the present invention.

When light blocking plate 4 goes into the reference light bundle more deeply, a state shown in FIG. 37 is attained. In this figure, shadow 13 of light blocking plate 4 goes into reference circle 11 to cover most of reference circle 11. Regions where the light can pass inside reference circle 11 are only two small regions located in an upper part in the figure.

Figure 38:
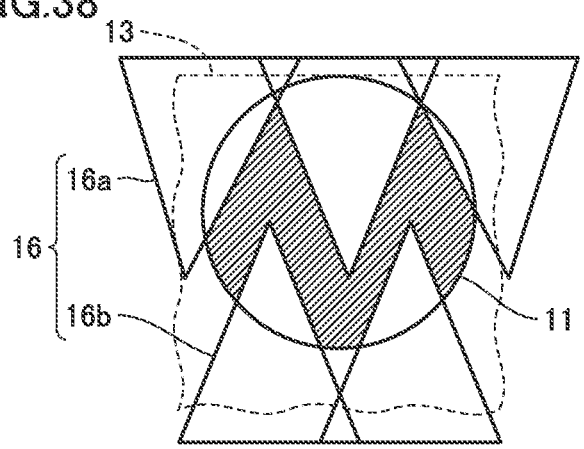
FIG. 38 is an explanatory diagram of a light passing state when the shadow of the light blocking plate coming from the lower side is located at a fifth position in the projection system according to the second embodiment based on the present invention.

When light blocking plate 4 goes into the reference light bundle more deeply, a state shown in FIG. 38 is attained. In this figure, shadow 13 of light blocking plate 4 goes into reference circle 11 to cover the whole of reference circle 11. The light passing regions in the gaps between diaphragm plates 16a and 16b are all completely covered with shadow 13.

Figure 39:
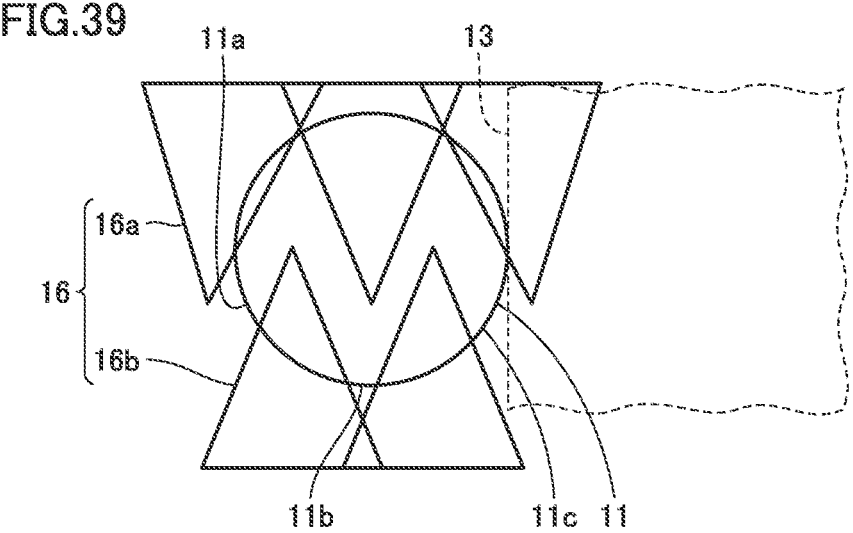
FIG. 39 is an explanatory diagram of a light passing state when the shadow of the light blocking plate coming from the right side is located at a first position in the projection system according to the second embodiment based on the present invention.

Secondly, a case in which shadow 13 goes into reference circle 11 from right to left will be described. First, when light blocking plate 4 does not block the reference light bundle at all, a state shown in FIG. 39 is attained. In this figure, shadow 13 of light blocking plate 4 is located below reference circle 11 and outside reference circle 11.

Figure 40:
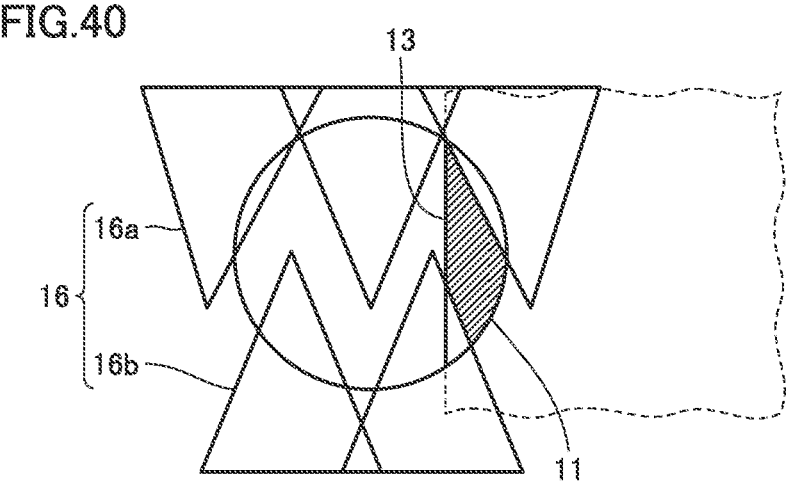
FIG. 40 is an explanatory diagram of a light passing state when the shadow of the light blocking plate coming from the right side is located at a second position in the projection system according to the second embodiment based on the present invention.

Next, when light blocking plate 4 goes into the reference light bundle to a certain extent, a state shown in FIG. 40 is attained. In the state shown in this figure, shadow 13 of light blocking plate 4 goes into reference circle 11.

Figure 41:
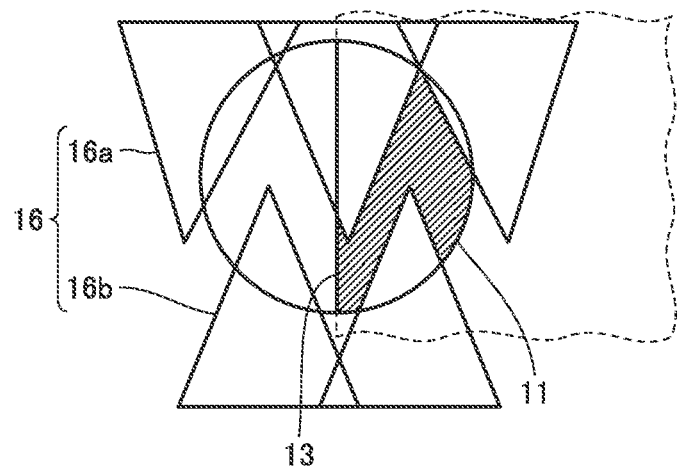
FIG. 41 is an explanatory diagram of a light passing state when the shadow of the light blocking plate coming from the right side is located at a third position in the projection system according to the second embodiment based on the present invention.

When light blocking plate 4 goes into the reference light bundle more deeply, a state shown in FIG. 41 is attained. In this figure, shadow 13 of light blocking plate 4 goes into a half of reference circle 11.

Figure 42:
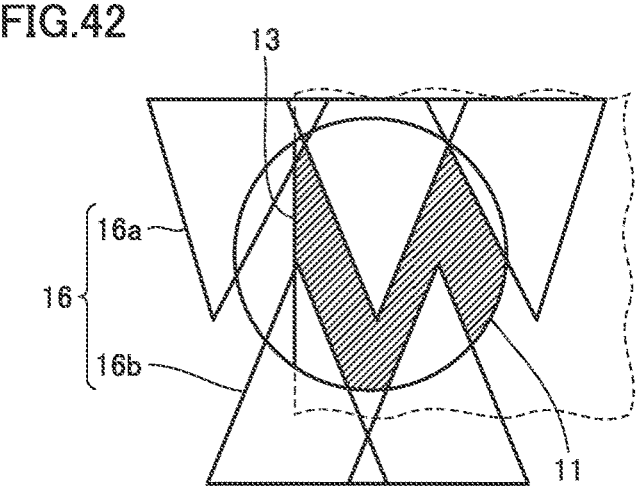
FIG. 42 is an explanatory diagram of a light passing state when the shadow of the light blocking plate coming from the right side is located at a fourth position in the projection system according to the second embodiment based on the present invention.

When light blocking plate 4 goes into the reference light bundle more deeply, a state shown in FIG. 42 is attained. In this figure, shadow 13 of light blocking plate 4 goes into reference circle 11 to cover most of reference circle 11. A region where the light can pass inside reference circle 11 is only one small region located in a left part in the figure.

Figure 43:
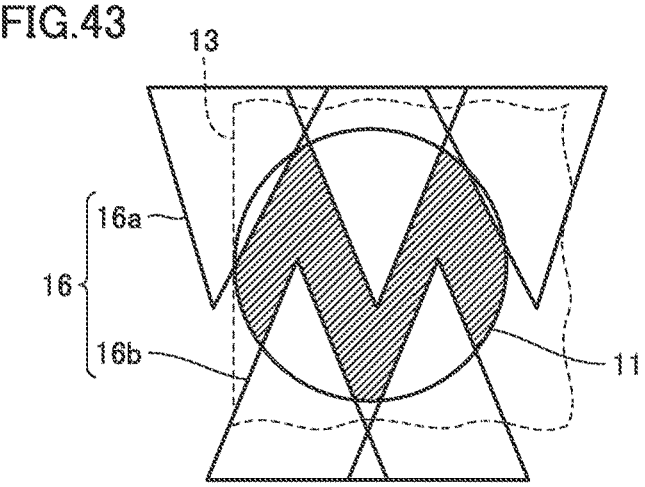
FIG. 43 is an explanatory diagram of a light passing state when the shadow of the light blocking plate coming from the right side is located at a fifth position in the projection system according to the second embodiment based on the present invention.

When light blocking plate 4 goes into the reference light bundle more deeply, a state shown in FIG. 43 is attained. In this figure, shadow 13 of light blocking plate 4 goes into reference circle 11 to cover the whole of reference circle 11. The light passing regions in the gaps between diaphragm plates 16a and 16b are all completely covered with shadow 13.

In both of the first case (FIG. 34 to FIG. 38) and the second case (FIG. 39 to FIG. 43), the area of the light passing regions inside reference circle 11 gradually decreases from 100%, and when shadow 13 of light blocking plate 4 completely covers the internal region of reference circle 11, the area of the light passing regions inside reference circle 11 reaches 0%. Although not completely precisely proportional, the degree of shadow 13 going into reference circle 11 and the area of the light passing regions can show a change close to that when the degree of shadow 13 going into reference circle 11 and the area of the light passing regions are proportional.

In the present embodiment as well, the gradation can be formed in the range that is almost identical to the range of the target gradation, regardless of from which side shadow 13 of light blocking plate 4 comes. In other words, in the present embodiment, a desired gradation can be formed in a type of edge blending using a light blocking plate, regardless of a direction of entry of the light blocking plate.

As described in the present embodiment, the comb shape preferably includes a plurality of protruding portions, and each of the plurality of protruding portions preferably has such a tapered shape that a width becomes narrower toward a tip. With this configuration, it becomes easy to gradually reduce an area of the light transmission regions as equally as possible.

Third Embodiment

Figure 44:
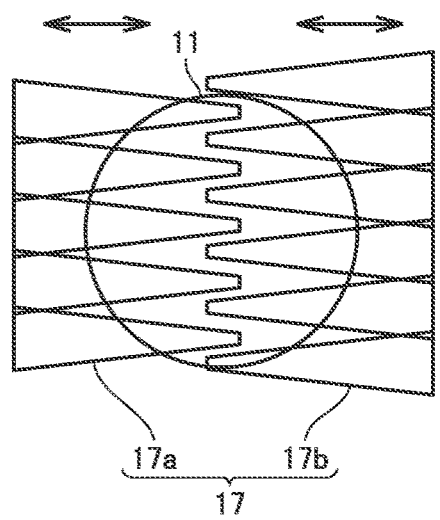
FIG. 44 is an explanatory diagram of an aperture diaphragm included in a projection system according to a third embodiment based on the present invention.

A projection system according to a third embodiment based on the present invention will be described with reference to FIG. 44 to FIG. 61. Since an overall configuration is similar to that described with reference to FIG. 1, description will not be repeated. The projection system includes an aperture diaphragm 17 as aperture diaphragm 5 in FIG. 3. Aperture diaphragm 17 includes diaphragm plates 17a and 17b. Each of diaphragm plates 17a and 17b has a comb shape formed by combining a plurality of substantially isosceles triangular shapes. Diaphragm plates 17a and 17b are arranged to face each other, and each of diaphragm plates 17a and 17b can move forward and backward in a radial direction of reference circle 11 from two directions as shown by arrows in FIG. 44. In a state where aperture diaphragm 17 is completely closed, the protruding and recessed shapes of diaphragm plates 17a and 17b engage with each other completely, such that an opening is zero. FIG. 44 shows a state in which aperture diaphragm 17 is narrowed to a certain extent.

Figure 45:
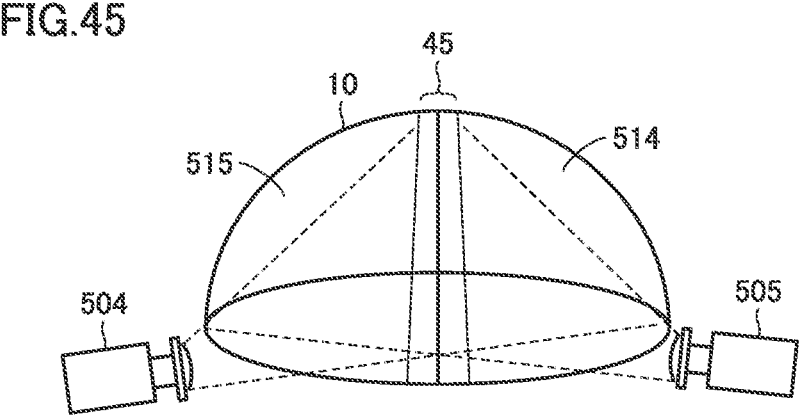
FIG. 45 is an explanatory diagram of a state of projecting images onto the whole of a hemispherical dome ceiling using the projection system according to the third embodiment based on the present invention.

FIG. 45 shows a state of projecting a set of images onto the whole of a hemispherical dome ceiling 10 using the projection system according to the present embodiment. The projection system according to the present embodiment includes projectors 504 and 505. Although only the two projectors are illustrated herein for convenience in description, three or more projectors may be actually combined. Dome ceiling 10 may be a ceiling of a planetarium. The projection system according to the present embodiment may be a projection system that projects the night sky.

Figure 46:
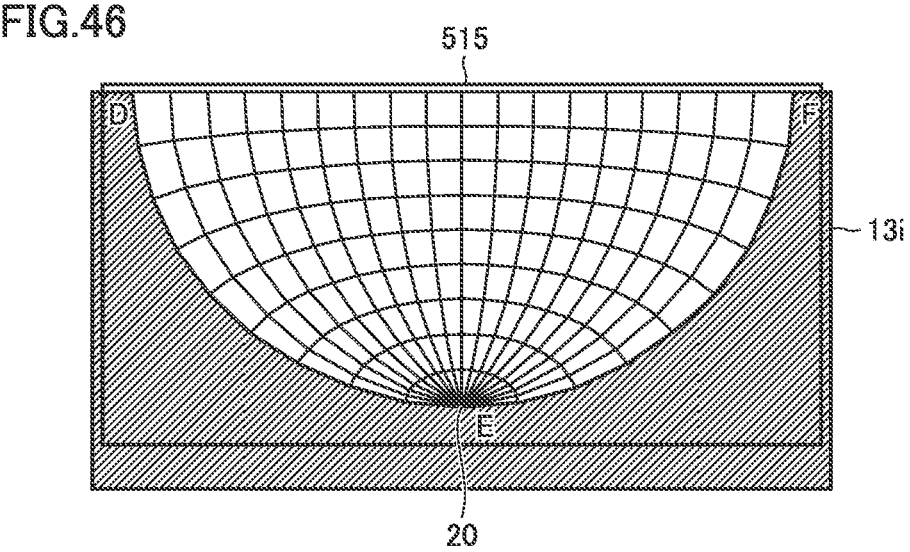
FIG. 46 is a planarly developed view of an image projected by one projector included in the projection system according to the third embodiment based on the present invention.
Figure 47:
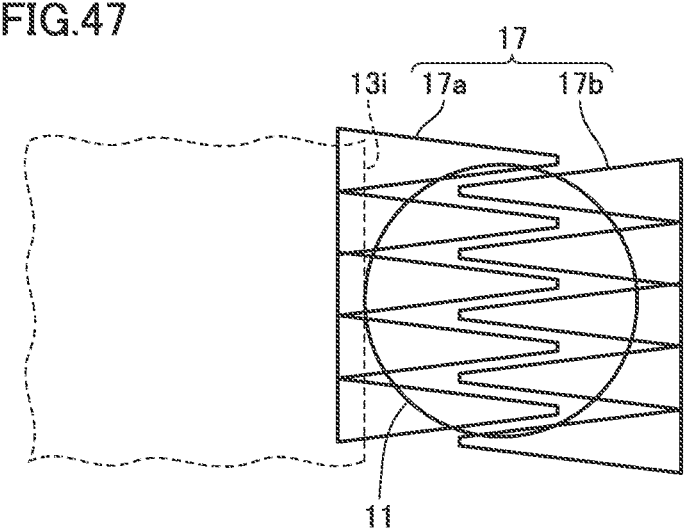
FIG. 47 is an explanatory diagram of a light passing state when a shadow of a light blocking plate coming from the left side is located at a first position in the projection system according to the third embodiment based on the present invention.
Figure 48:
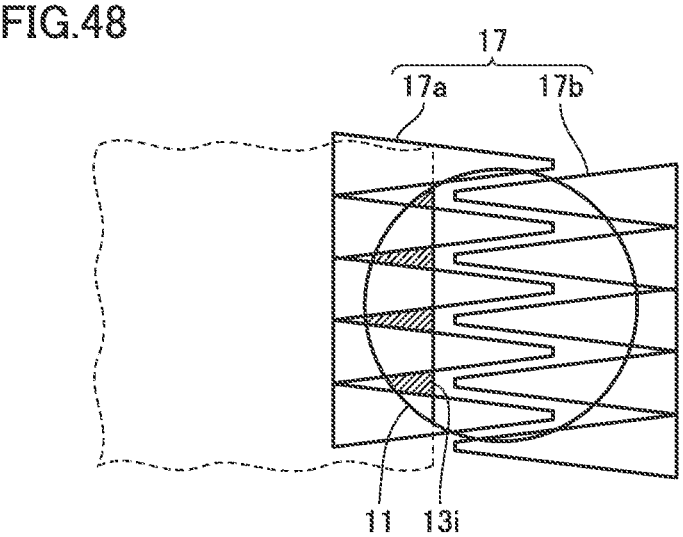
FIG. 48 is an explanatory diagram of a light passing state when the shadow of the light blocking plate coming from the left side is located at a second position in the projection system according to the third embodiment based on the present invention.
Figure 49:
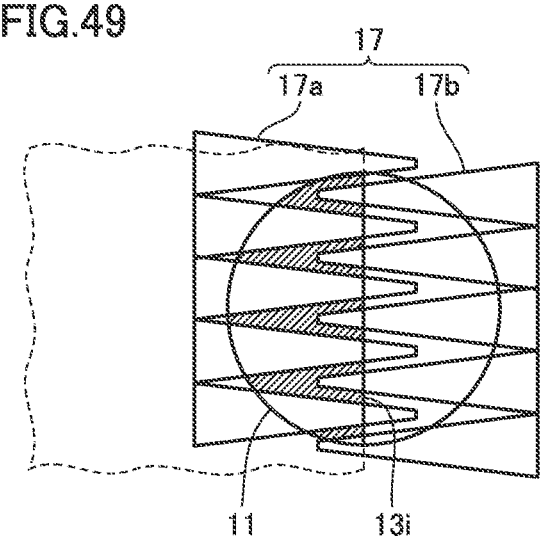
FIG. 49 is an explanatory diagram of a light passing state when the shadow of the light blocking plate coming from the left side is located at a third position in the projection system according to the third embodiment based on the present invention.
Figure 50:
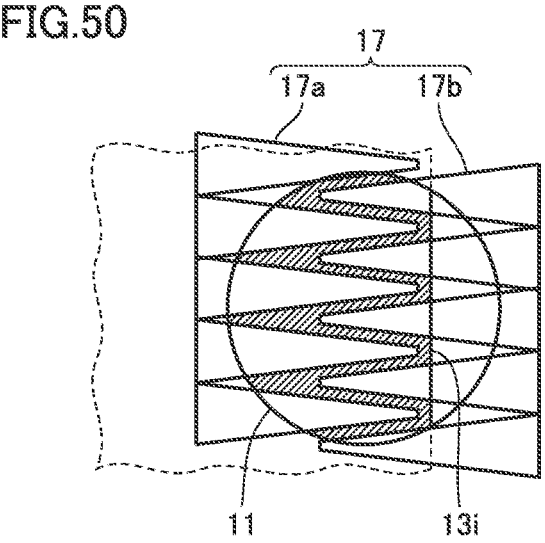
FIG. 50 is an explanatory diagram of a light passing state when the shadow of the light blocking plate coming from the left side is located at a fourth position in the projection system according to the third embodiment based on the present invention.

Projector 504 generates an image 514 and projector 505 generates an image 515. Each of images 514 and 515 occupies almost a half of dome ceiling 10. Images 514 and 515 include an overlapping portion 45. Attention is focused on image 515 generated by projector 505 and a planarly developed view of image 515 is shown in FIG. 46. As shown in this figure, a point E represents a dome zenith 20, and points D and F represent right and left ends. Image 515 is projected as a result of blocking a part of the light by a shadow 13i of a light blocking plate. Shadow 13i has a shape formed by cutting a semicircular shape DEF from a rectangular shape. In this case as well, the way in which a gradation is formed by shadow 13i of the light blocking plate at each point of an arc DEF is important. In the vicinity of any of points D, E and F, a degree of the light blocking plate going into a light bundle depends on a position of a light bundle on which attention is focused.

When attention is focused on a light bundle in the vicinity of point D, the light blocking plate goes into the light bundle from left to a certain extent. In the vicinity of point D, a gradation that becomes brighter from left to right in the figure is obtained.

When attention is focused on a light bundle in the vicinity of point E, the light blocking plate goes into the light bundle from below to a certain extent. In the vicinity of point E, a gradation that becomes brighter from bottom to top in the figure is obtained.

When attention is focused on a light bundle in the vicinity of point F, the light blocking plate goes into the light bundle from right to a certain extent. In the vicinity of point F, a gradation that becomes brighter from right to left in the figure is obtained.

Figure 51:
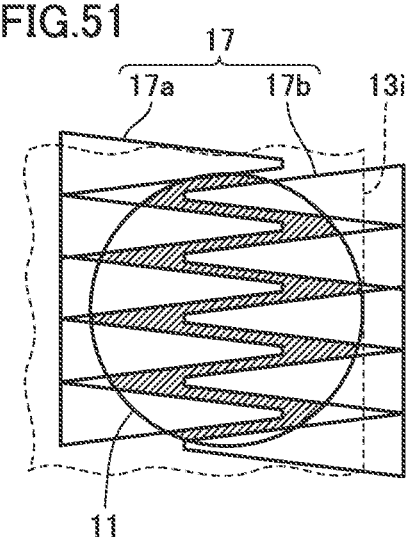
FIG. 51 is an explanatory diagram of a light passing state when the shadow of the light blocking plate coming from the left side is located at a fifth position in the projection system according to the third embodiment based on the present invention.
Figure 52:
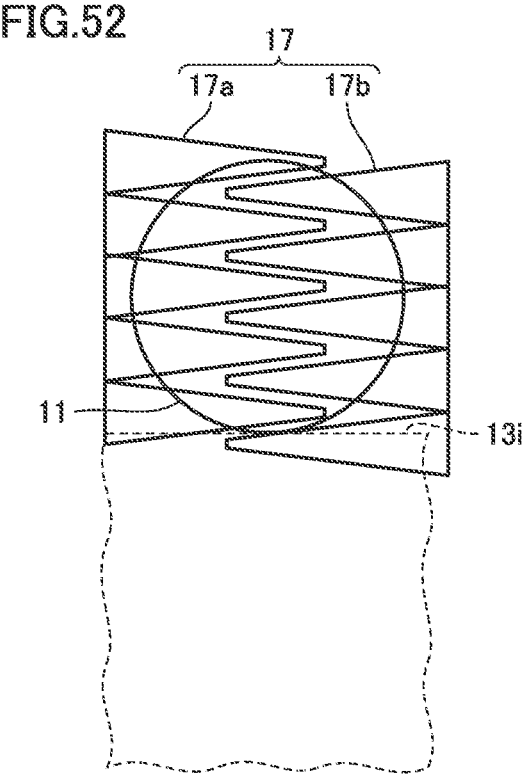
FIG. 52 is an explanatory diagram of a light passing state when the shadow of the light blocking plate coming from the lower side is located at a first position in the projection system according to the third embodiment based on the present invention.
Figure 53:
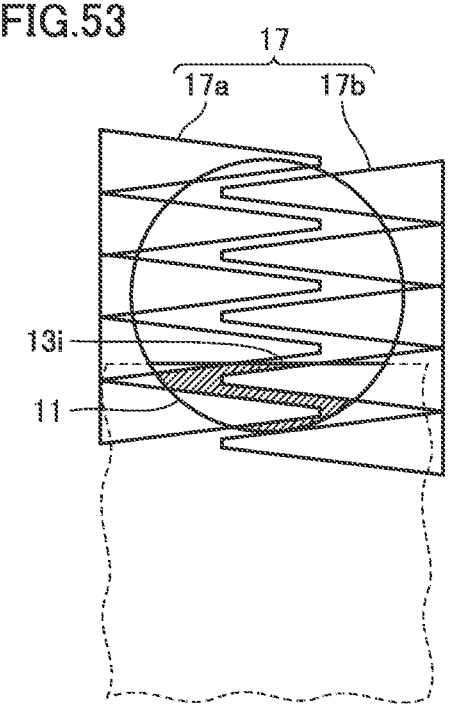
FIG. 53 is an explanatory diagram of a light passing state when the shadow of the light blocking plate coming from the lower side is located at a second position in the projection system according to the third embodiment based on the present invention.
Figure 54:
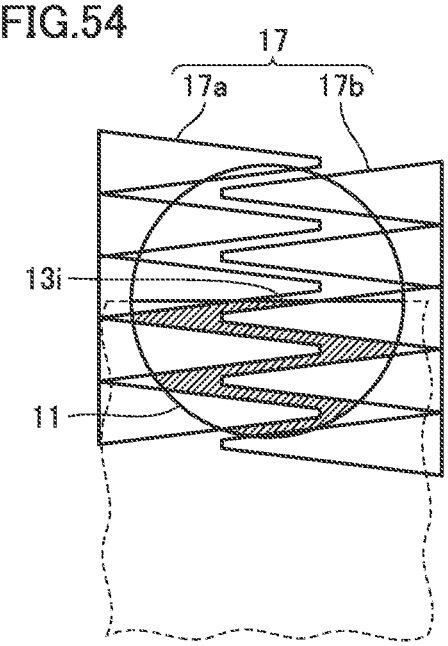
FIG. 54 is an explanatory diagram of a light passing state when the shadow of the light blocking plate coming from the lower side is located at a third position in the projection system according to the third embodiment based on the present invention.
Figure 55:
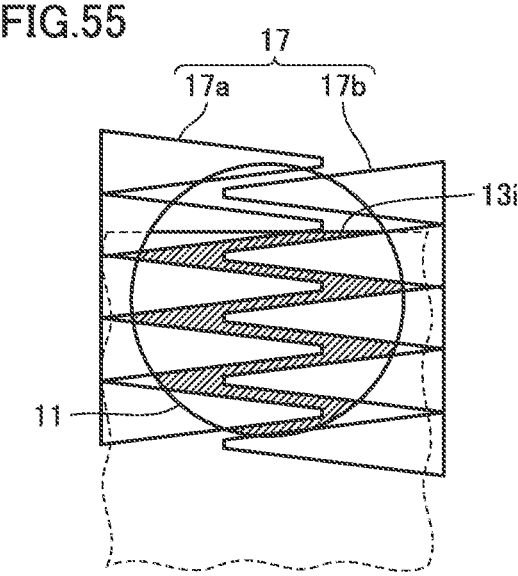
FIG. 55 is an explanatory diagram of a light passing state when the shadow of the light blocking plate coming from the lower side is located at a fourth position in the projection system according to the third embodiment based on the present invention.

Firstly, a case in which shadow 13i of the light blocking plate gradually goes into reference circle 11 deeply from left to right in the figure will be described. This corresponds to the situation in the vicinity of point D. Starting from FIG. 47, a degree of shadow 13i going into reference circle 11 changes, and in accordance therewith, an area of light passing regions changes as sequentially shown in FIG. 48, FIG. 49, FIG. 50, and FIG. 51. In FIG. 51, the light passing regions in the gaps between diaphragm plates 17a and 17b are completely covered with shadow 13i.

Figure 56:
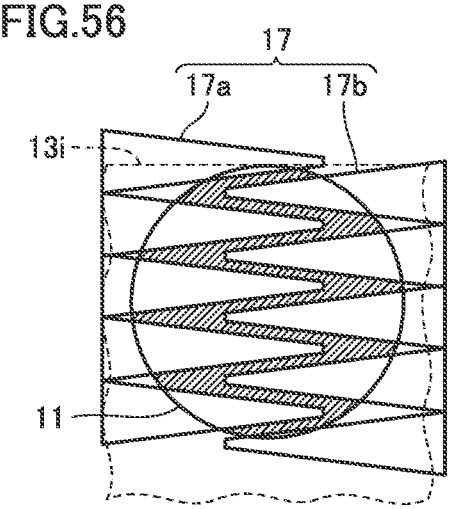
FIG. 56 is an explanatory diagram of a light passing state when the shadow of the light blocking plate coming from the lower side is located at a fifth position in the projection system according to the third embodiment based on the present invention.
Figure 57:
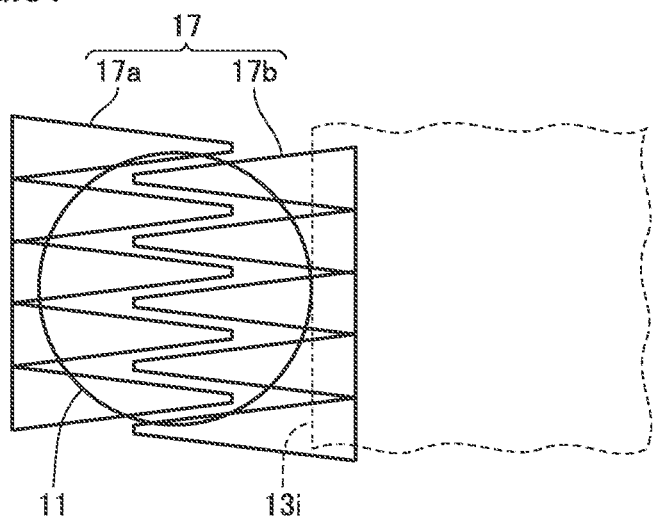
FIG. 57 is an explanatory diagram of a light passing state when the shadow of the light blocking plate coming from the right side is located at a first position in the projection system according to the third embodiment based on the present invention.
Figure 58:
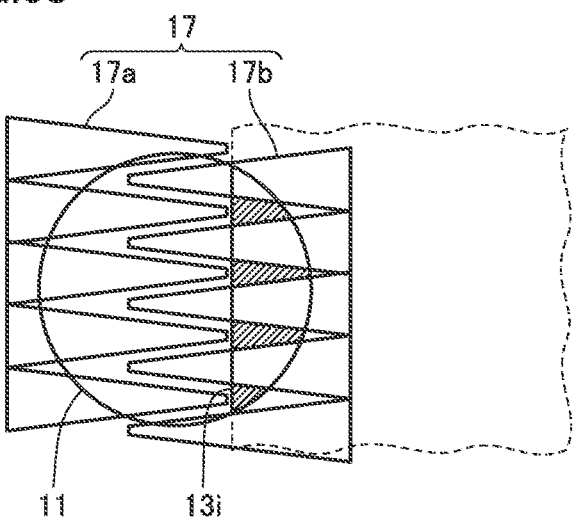
FIG. 58 is an explanatory diagram of a light passing state when the shadow of the light blocking plate coming from the right side is located at a second position in the projection system according to the third embodiment based on the present invention.
Figure 59:
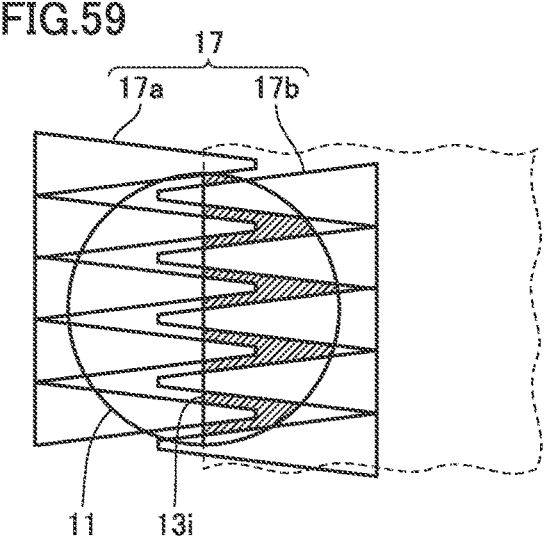
FIG. 59 is an explanatory diagram of a light passing state when the shadow of the light blocking plate coming from the right side is located at a third position in the projection system according to the third embodiment based on the present invention.
Figure 60:
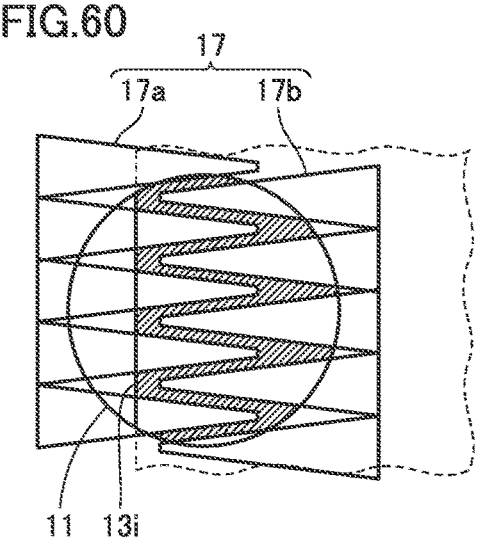
FIG. 60 is an explanatory diagram of a light passing state when the shadow of the light blocking plate coming from the right side is located at a fourth position in the projection system according to the third embodiment based on the present invention.

Secondly, a case in which shadow 13i of the light blocking plate gradually goes into reference circle 11 deeply from bottom to top in the figure will be described. This corresponds to the situation in the vicinity of point E. Starting from FIG. 52, a degree of shadow 13i going into reference circle 11 changes, and in accordance therewith, an area of light passing regions changes as sequentially shown in FIG. 53, FIG. 54, FIG. 55, and FIG. 56. In FIG. 56, the light passing regions in the gaps between diaphragm plates 17a and 17b are completely covered with shadow 13i.

Figure 61:
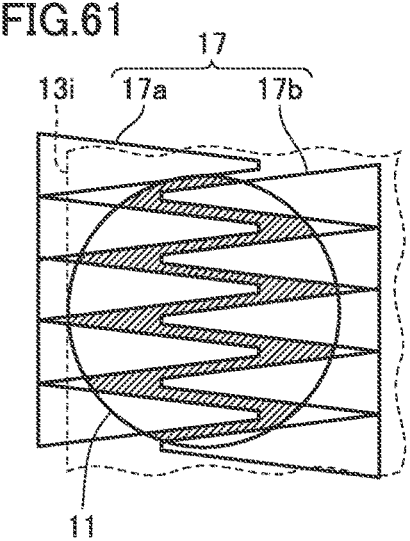
FIG. 61 is an explanatory diagram of a light passing state when the shadow of the light blocking plate coming from the right side is located at a fifth position in the projection system according to the third embodiment based on the present invention.

Thirdly, a case in which shadow 13i of the light blocking plate gradually goes into reference circle 11 deeply from right to left in the figure will be described. This corresponds to the situation in the vicinity of point F. Starting from FIG. 57, a degree of shadow 13i going into reference circle 11 changes, and in accordance therewith, an area of light passing regions changes as sequentially shown in FIG. 58, FIG. 59, FIG. 60, and FIG. 61. In FIG. 61, the light passing regions in the gaps between diaphragm plates 17a and 17b are completely covered with shadow 13i.

In any of the first case (FIG. 47 to FIG. 51), the second case (FIG. 52 to FIG. 56) and the third case (FIG. 57 to FIG. 61), the area of the light passing regions inside reference circle 11 gradually decreases from 100%, and when shadow 13 of light blocking plate 4 completely covers the internal region of reference circle 11, the area of the light passing regions inside reference circle 11 reaches 0%. Although not completely proportional, the degree of shadow 13 going into reference circle 11 and the area of the light passing regions can show a change close to that when the degree of shadow 13 going into reference circle 11 and the area of the light passing regions are proportional.

In the present embodiment, the gradation can be formed in the range that is almost identical to the range of the target gradation, regardless of from which side shadow 13i of light blocking plate 4 comes. In other words, in the present embodiment, a desired gradation can be formed in a type of edge blending using a light blocking plate, regardless of a direction of entry of the light blocking plate. Thus, a gradation can be similarly formed in the vicinity of any of point D, point E and point F in FIG. 46. By matching the gradation with overlapping portion 45 in FIG. 45, good images having inconspicuous joints can be generated across dome ceiling 10.

Fourth Embodiment

Figure 62:
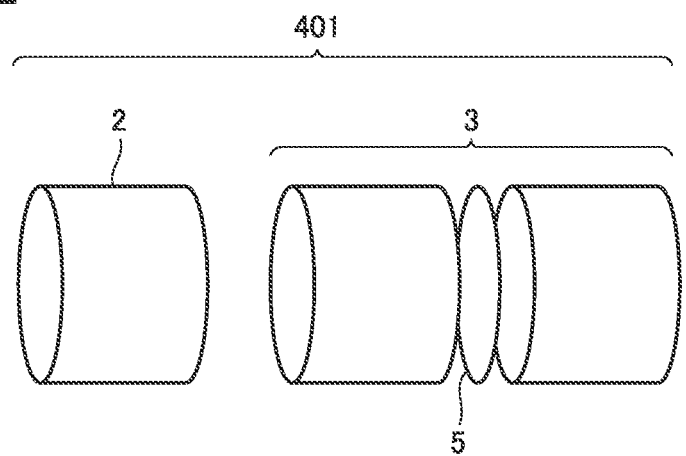
FIG. 62 is a conceptual diagram of a projection lens unit according to a fourth embodiment based on the present invention.
Figure 63:
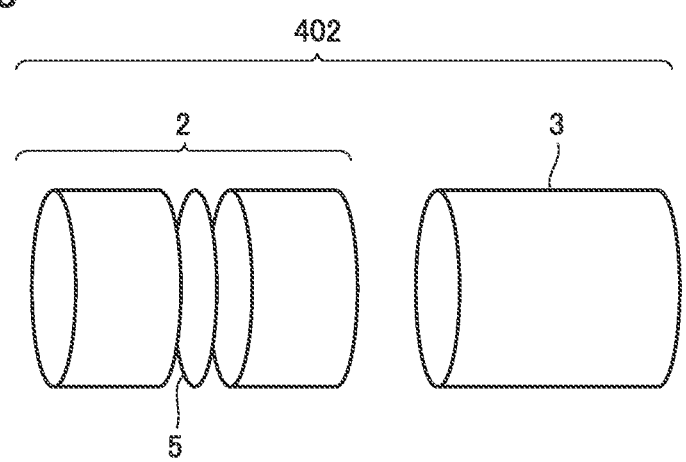
FIG. 63 is a conceptual diagram of a modification of the projection lens unit according to the fourth embodiment based on the present invention.

A projection lens unit based on the present invention will be described with reference to FIG. 62 to FIG. 63. FIG. 3 in the first embodiment shows projector 501. However, the projection lens unit can be implemented by removing image display element 1 and light blocking plate 4 from projector 501. FIG. 62 shows a conceptual diagram of a projection lens unit 401. Projection lens unit 401 is a part of projector 501. Projection lens unit 401 includes aperture diaphragm 5 and a feature of aperture diaphragm 5 is similar to that described in the first embodiment. Therefore, a configuration of projection lens unit 401 can be described as follows.

Projection lens unit 401 includes aperture diaphragm 5 that changes an amount of passing light, wherein when a circle formed by an outermost perimeter of a light passing region obtained when aperture diaphragm 5 is completely opened is defined as reference circle 11, aperture diaphragm 5 partially covers the inside of reference circle 11 such that an outline of reference circle 11 is divided into three or more sections in a state where aperture diaphragm 5 is narrowed to make an area of the light passing region inside reference circle 11 half reference circle 11.

According to projection lens unit 401 in the present embodiment, a desired gradation can be formed in a type of edge blending using a light blocking plate, regardless of a direction of entry of the light blocking plate.

FIG. 62 shows the example in which projection lens unit 401 includes relay system lens group 2 and projection system lens group 3, and projection system lens group 3 includes aperture diaphragm 5. However, the present invention is not limited to such a configuration, and a projection lens unit 402 shown in FIG. 63 may, for example, be used. Projection lens unit 402 includes relay system lens group 2 and projection system lens group 3, and relay system lens group 2 includes aperture diaphragm 5. Projection lens unit 402 can also produce an effect similar to that of projection lens unit 401.

Light blocking plate 4 is not limited to a light blocking plate that completely blocks light, which holds true for all of the embodiments that have been described so far. For example, a light blocking plate having such a property that a light transmittance becomes greater toward a lens optical axis may be used.

The foregoing embodiments disclosed herein are illustrative and non-restrictive in every respect. The scope of the present invention is defined by the terms of the claims and is intended to include any modifications within the scope and meaning equivalent to the terms of the claims.

REFERENCE SIGNS LIST 1 image display element; 2 relay system lens group; 3 projection system lens group; 4 light blocking plate; 5 aperture diaphragm; 6 region (of shadow generated by light blocking plate); 10 dome ceiling; 11 circle (when diaphragm is opened); 12 circle (narrowed by circular diaphragm); 13, 13i shadow (of light blocking plate); 14 diaphragm plate (of plate-shaped diaphragm); 15, 16, 17 aperture diaphragm; 15a, 15b, 15c (diaphragm plate having a triangular shape); 16a, 16b, 17a, 17b diaphragm plate (having a comb shape); 20 dome zenith; 41, 42, 45 overlapping portion; 401, 402 projection lens unit; 501, 502, 503, 504, 505 projector; 511, 512, 513, 514, 515 image.

The invention claimed is:

1. A projection system comprising a plurality of projectors that perform edge blending,
 each of the plurality of projectors including:
  an image display element;
  a light blocking plate that reduces an amount of light in an edge overlapping portion of a light bundle emitted from the image display element; and
  an aperture diaphragm that changes an amount of light traveling from the image display element toward an object to be projected, wherein
 when a circle formed by an outermost perimeter of a light passing region obtained when the aperture diaphragm is completely opened is defined as a reference circle, the aperture diaphragm partially covers the inside of the reference circle such that an outline of the reference circle is divided into three or more sections in a state where the aperture diaphragm is narrowed to make an area of the light passing region inside the reference circle half the reference circle.

2. The projection system according to claim 1, wherein the aperture diaphragm includes two diaphragm plates held to be movable forward and backward in a radial direction of the reference circle from two directions opposite to each other, to block light.

3. The projection system according to claim 2, wherein each of the two diaphragm plates has a comb shape.

4. The projection system according to claim 3, wherein the comb shape includes a plurality of protruding portions, and each of the plurality of protruding portions has such a tapered shape that a width becomes narrower toward a tip.

5. The projection system according to claim 1, wherein the aperture diaphragm includes three or more diaphragm plates held to be movable forward and backward in a radial direction of the reference circle from three or more directions.

6. The projection system according to claim 5, wherein each of the three or more diaphragm plates has such a tapered shape that a width becomes narrower toward a tip.

7. A projection lens unit comprising an aperture diaphragm that changes an amount of passing light, wherein
 when a circle formed by an outermost perimeter of a light passing region obtained when the aperture diaphragm is completely opened is defined as a reference circle, the aperture diaphragm partially covers the inside of the reference circle such that an outline of the reference circle is divided into three or more sections in a state where the aperture diaphragm is narrowed to make an area of the light passing region inside the reference circle half the reference circle.

* * * * *